(12) United States Patent
Kikuchi et al.

(10) Patent No.: US 6,775,441 B2
(45) Date of Patent: Aug. 10, 2004

(54) OPTICAL WAVEGUIDE CONNECTING STRUCTURE, OPTICAL ELEMENT MOUNTING STRUCTURE AND OPTICAL FIBER MOUNTING STRUCTURE

(75) Inventors: Hideo Kikuchi, Tokyo (JP); Toshiyuki Shima, Tokyo (JP)

(73) Assignee: NEC Toppan Circuit Solutions, Inc., Tokyo (JP)

( * ) Notice: Subject to any disclaimer, the term of this patent is extended or adjusted under 35 U.S.C. 154(b) by 331 days.

(21) Appl. No.: 09/917,873

(22) Filed: Jul. 31, 2001

(65) Prior Publication Data

US 2002/0015562 A1 Feb. 7, 2002

(30) Foreign Application Priority Data

Jul. 31, 2000 (JP) ........................................ 2000-232479

(51) Int. Cl.[7] .............................. G02B 6/26; G02B 6/42
(52) U.S. Cl. ...................................................... 385/50
(58) Field of Search ............................ 385/47, 43, 49, 385/14, 50, 39, 42, 93, 130

(56) References Cited

U.S. PATENT DOCUMENTS

2003/0185517 A1 * 10/2003 Kobayashi et al. .......... 385/50

* cited by examiner

Primary Examiner—Chandrika Prasad
(74) Attorney, Agent, or Firm—Sughrue Mion, PLLC

(57) ABSTRACT

Provided is an optical waveguide connecting structure, having a first optical waveguide film cut in such a manner that a first core layer surface is exposed along an optical path direction in a slightly slant section forming an angle of about 5° or smaller, and a second optical waveguide film in which a second core layer is formed at a position opposed to the exposed surface of the first core layer in a slightly slant section forming an angle of about 5° or less with an optical path of the first core layer. The first core layer and the second core layer are connected at approximately the same height position from a reference surface.

21 Claims, 14 Drawing Sheets

OPTICAL WAVEGUIDE CONNECTING STRUCTURE, OPTICAL ELEMENT MOUNTING STRUCTURE AND OPTICAL FIBER MOUNTING STRUCTURE

BACKGROUND OF THE INVENTION

1. Field of the Invention

The present invention relates to an optical waveguide connecting structure, an optical element mounting structure and an optical fiber mounting structure. More particularly, the present invention relates to an optical waveguide connecting structure, an optical element mounting structure, and an optical fiber mounting structure, in which core layers are connected to each other to make an optical coupling by using a plurality of optical waveguide films each having the core layer covered with a clad layer on the periphery thereof, the core layer functioning as an optical waveguide.

The present application claims priority of Japanese Patent Application No.2000-232479 filed on Jul. 31, 2000, which is hereby incorporated by reference.

2. Description of the Related Art

Optical communications technology using light as a transmission medium of information is widely used. To implement the optical communications technology, an optical module is used in which optical elements such as a light emitting element and a light receiving element are mounted on an optoelectronic substrate and the optical elements are connected to each other via an optical waveguide, thus making an optical coupling. In the optical module, optical signals need to be transmitted through the optical waveguide without being attenuated. Moreover, when assembling the optical module, it is necessary to prepare an optical waveguide connecting structure, in which the optical waveguide is formed on the optoelectronic substrate in advance and to mount the optical elements by using this optical waveguide connecting structure.

FIG. 25 is a plan view schematically showing a constitution of the optical element mounting structure, in which optical elements are mounted by using a conventional optical waveguide connecting structure. In the optical element mounting structure, as shown in FIG. 25, a plurality of optical elements 102 are mounted on a base substrate (optoelectronic substrate) 101 composed of a printed circuit board or the like, and the plurality of optical elements 102 are connected to each other via optical fibers 103 functioning as the optical waveguide. A light distributor 104 may be connected at a halfway position of the optical fibers 103 if required, and optical signals are distributed through each of optical fibers 103.

In the conventional optical element mounting structure described above, since at least one or more optical fibers 103 are required for every optical element 102, a considerable number of optical fibers 103 are needed in total. Therefore, in the optical element mounting structure which requires a large number of optical elements 102, the optical fibers 103 are arranged on the base substrate 101 complicatedly.

As described above, in the conventional optical waveguide connecting structure and the optical element mounting structure, arrangement of the optical fibers functioning as the optical waveguide for making the optical coupling between the optical elements becomes complicated, which causes a problem in that it is difficult to stably fix the optical waveguide.

Specifically, in the optical element mounting structure using the conventional optical waveguide connecting structure, as shown in FIG. 25, when many optical fibers 103 functioning as the optical waveguide are required, the optical fibers 103 are apt to be loosely fixed. Accordingly, if an external force is applied thereto by contacting with an obstacle or the like, the optical fiber 103 is vibrated, and thus the optical fiber 103 tends to be damaged easily. Therefore, reliability of the optical element mounting structure is lowered. If the optical fiber is fixed firmly to the base substrate in advance in order to correct such defects, positioning of the optical fiber and the optical element becomes complicated, and thus attachment operation of the optical element takes a lot of time and labor.

SUMMARY OF THE INVENTION

In view of the above, it is an object of the present invention to provide an optical waveguide connecting structure, an optical element mounting structure, and an optical fiber mounting structure capable of easily making connection among optical waveguides with high accuracy.

According to a first aspect of the present invention, there is provided an optical waveguide connecting structure in which core layers are connected to make an optical coupling therebetween by using a plurality of optical waveguide films each having the core layers covered with a clad layer on the periphery thereof, the core layers functioning as an optical waveguide, including:

a first optical waveguide provided with a first core layer, in which a first section slightly slants relative to an optical path direction of the first core layer is set to form a small angle of approximately 5° or less with the optical path direction and the first core layer is exposed in the first section; and a second optical waveguide provided with a second core layer, in which the second core layer is exposed at one end portion thereof in a section forming an angle of approximately 5° or less with the optical path direction, wherein the first section and the second section are opposed and connected to each other while setting both of the first core layer and the second core layer at approximately a same height from a common reference surface.

In the foregoing first aspect, a preferable mode is one wherein at least one of the first optical waveguide and the second optical waveguide is formed of an optical waveguide film Also, a preferable mode is one wherein each of the first section of the first optical waveguide and the second section of the second optical waveguide is formed of a section vertical to a surface of the first optical waveguide.

Also, a preferable mode is one wherein each of the first section of the first optical waveguide and the second section of the second optical waveguide is formed of a slant surface relative to the vertical direction to a surface of the first optical waveguide.

Also, a preferable mode is one wherein the second optical waveguide includes a mirror surface, which is formed of a third section cut obliquely relative to a thickness direction, at an other end portion at an opposite side of the one end portion of the second core layer.

Also, a preferable mode is one wherein the first optical waveguide and the second optical waveguide are formed on a base substrate.

Also, a preferable mode is one wherein the first optical waveguide is formed on a base substrate, the second optical waveguide is formed on a reference plate, and the core layer of the second optical waveguide is aligned with the core layer of the first optical waveguide at a same height from the reference plate as the reference surface by abutting the first optical waveguide to the reference plate.

Also, a preferable mode is one wherein the first optical waveguide is cut to expose a side surface of the first core layer in a section along the optical path direction from the one end portion to the other end portion.

Also, a preferable mode is one wherein the optical waveguide connecting structure further includes:

a third optical waveguide having a third core layer formed thereon and a mirror surface formed on the third core layer by cutting the third core layer obliquely relative to a thickness direction at an other end portion, the third core layer being partially exposed at a position opposed to an exposed surface of the first core layer in a side surface of the one end portion, being extended having a specified angle relative to an exposed surface of the first core layer from the exposed portion to a halfway portion, and being extended in parallel to the exposed surface of the first core layer from the halfway portion to the other end portion, wherein the first core layer and the third core layer are connected at approximately a same height position while maintaining a relation that a mirror surface of the third core layer and the mirror surface of the second core layer are arranged to be opposed to each other.

Also, a preferable mode is one wherein at least one of the second core layer and the third core layer is adhered to the first core layer by an adhesive having approximately a same refractive index as those of the first core layer to the third core layer.

Also, a preferable mode is one wherein the two first optical waveguides are used to be arranged on a base substrate such that the optical path directions thereof form a specified angle, the second optical waveguide is provided, which has the second sections at both end portions of the core layer thereof, the second sections being opposed to the first sections of the two first optical waveguides, and the core layer of the second optical waveguide forms a curved-shape to change the optical path direction by a specific angle.

Also, a preferable mode is one wherein, instead of the second optical waveguide, an optical waveguide is used, in which a mirror surface for totally reflecting optical signals is formed at a halfway position of the core layer functioning as the optical waveguide by which the optical signals are made incident and emitted.

According to a second aspect of the present invention, there is provided an optical element mounting structure assembled by using an optical waveguide connecting structure, including:

an optical waveguide connecting structure in which core layers are connected to make an optical coupling therebetween by using a plurality of optical waveguide films each having the core layers covered with a clad layer on the periphery thereof, the core layers functioning as an optical waveguide, including: a first optical waveguide provided with a first core layer, in which a first section slightly slants relative to an optical path direction of the first core layer is set to form a small angle of approximately 5 degrees or less with the optical path direction and the first core layer is exposed in the first section; and a second optical waveguide provided with a second core layer, in which the second core layer is exposed at one end portion thereof in a section forming an angle of approximately 5 degrees or less with the optical path direction, wherein the first section and the second section are opposed and connected to each other while setting both of s the first core layer and the second core layer at approximately a same height from a common reference surface; and wherein the second optical waveguide includes a mirror surface, which is formed of a third section cut obliquely relative to a thickness direction, at an other end portion at an opposite side of the one end portion of the second core layer; and an optical element substrate having an optical element connected thereto, wherein the optical element substrate is disposed such that the optical element is opposed to the mirror surface of the second core layer of the third section of the second optical waveguide. core layer of the third section of the second optical waveguide.

According to a third aspect of the present invention, there is provided an optical element mounting structure, including:

a base substrate having a first optical waveguide disposed thereon; and an optical element substrate, on which at least a second optical waveguide is disposed via a spacer and an optical element is mounted, wherein core layers of the first optical waveguide and the second optical waveguide are exposed in sections each forming a slight angle of approximately 5° or less with optical paths of the core layers, and the base substrate and the optical element substrate are combined by abutting the first optical waveguide to the surface of the spacer of the optical element substrate as a reference surface such that the sections of the core layers are opposed to each other at a same height from the base substrate.

According to a fourth aspect of the present invention, there is provided an optical element mounting structure, including:

a base substrate having a first optical waveguide disposed thereon; and an optical element substrate, on which at least a second optical waveguide is disposed via a spacer and an optical element is mounted, wherein core layers of the first optical waveguide and second optical waveguide are exposed in sections each forming a slight angle of approximately 5° or less with optical paths of the core layers, and the base substrate and the optical element substrate are combined by abutting the second optical waveguide to a surface of the base substrate as a reference surface such that the sections of the core layers are opposed to each other at a same height from the base substrate.

According to a fifth aspect of the present invention, there is provided an optical element mounting structure, including:

a first optical waveguide film, in which a section of a core layer is exposed at one end portion thereof and an other end portion of the core layer exposed in a first section forming a slight angle of about 5° or less with optical paths of the core layers at the other end portion of the first optical waveguide film;

an optical element of which any one of a light-emitting window and a light-receiving window of the optical element is connected to the section of the core layer of the first optical waveguide to form a combined body with the first optical waveguide film; and a second optical waveguide film, in which a core layer at least at one end portion thereof is exposed in a second section forming a slight angle of 5° or less with the optical path, wherein both the first optical waveguide film and the second optical waveguide film are placed on a base substrate and the core layer exposed in the first section and the core layer exposed in the second section are aligned at a same height by using the base substrate as a reference surface and are adhered to each other.

According to a sixth aspect of the present invention, there is provided an optical element mounting structure, including:

a first optical waveguide film, in which a section slants relative to a film surface is formed at one end portion, a core layer of a first optical waveguide is exposed in the section, and at an other end portion of the first optical waveguide film, the other end portion of the core layer is exposed in a first section forming a slight angle of approximately 5° or less with optical paths of the core layers;

an optical element connected to a surface of the first optical waveguide film at a position to which optical signals of the first optical waveguide totally reflected at the section are reached, a second optical waveguide film, in which at least one end portion of a core layer is exposed in a second section forming a slight angle of approximately 5° or less with the optical path, wherein both the first optical waveguide film and the second optical waveguide film are placed on a base substrate and the core layer exposed in the first section and the core layer exposed in the second section are aligned at a same height from the base substrate and are adhered to each other.

According to a seventh aspect of the present invention, there is provided an optical element mounting structure, including:

a printed circuit board, in which a first optical waveguide having a core layer connected to an optical element at one end portion thereof is disposed on a base substrate, and an other end portion of the core layer of the first optical waveguide is exposed in a first section forming an angle of approximately 5° or less with an optical path direction of the core layer; and a second optical waveguide film on the base substrate, having a core layer exposed in a second section forming a slight angle of approximately 5° or less with the optical path in one end portion thereof, wherein one end of the second optical waveguide film is placed on the base substrate of the printed circuit board while setting a height of the core layer from the base substrate approximately equal to that of the core layer of the first optical waveguide, and the core layer exposed in the second section of the second optical waveguide film and the core layer exposed in the first section of the printed circuit board are in contact with each other.

In the foregoing seventh aspect, a preferable mode is one wherein a reference plate covering a joint portion of the second optical waveguide film and the first optical waveguide is adhered onto the second optical waveguide film, and the height of the core layer of the second optical waveguide film is set equal to that of the core layer of the first optical waveguide by abutting the first optical waveguide to a surface of the reference plate.

Also, a preferable mode is one wherein the second optical waveguide film has a portion in which a width of the optical waveguide inside the second optical waveguide film is widened in a shape of a taper and a portion in which a space portion so as to cross the optical path of the core layer at the portion widened in the shape of the taper is formed, the portion being for connecting the widened core layers with interposing the space portion therebetween, and the space portion is formed to have a curved shape in which a width of the space in the direction of the optical path is widened as getting away from an optical axis of the core layer in a vertical direction.

According to an eighth aspect of the present invention, there is provided an optical fiber mounting structure, including:

a first optical waveguide film, in which, a fourth section slightly slants at approximately 5° or less relative to a film surface thereof is formed at one end portion, one end portion of a core layer is exposed in the fourth section, a first section is formed at an other portion of the core layer, the first section being approximately vertical to the film surface of the first optical waveguide film and forming an angle of approximately 5° or less with an optical path direction of the core layer;

an optical fiber having a section cut at an angle of approximately 5° or less respective to a core layer direction, the optical fiber being connected to the fourth section of the first optical waveguide film by aligning the core layers thereof; and a second optical waveguide film in which at least one end portion of the core layer is exposed in a second section vertical to the film surface and slightly slants at approximately 5° or less relative to the optical path, wherein both of the first optical waveguide film and the second optical waveguide film are placed on a base substrate and a height from the base substrate of the core layer exposed in the first section and that of the core layer exposed in the second section are set equal and adhered to each other.

With the above configurations, according to the optical waveguide mounting structure, optical element mounting structure, and the optical fiber mounting structure of the present invention, the first optical waveguide film, which is cut such that the first core layer is exposed in the slightly slant section forming an angle of 5° or less with the optical path direction, and the second optical waveguide film, in which the exposure surface of the second core layer is formed in the slightly slant section forming an angle of about 5° or less with the optical path of the core layer at the position opposed to the exposed surface of the first core layer in the side surface of the one end portion, are provided. The first core layer and second core layer are connected at approximately the same height position from the reference surface. Thus, the optical waveguide for performing the optical transmission can be stably fixed. Therefore, optical coupling between the optical waveguides can be easily performed with high accuracy.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Best modes for carrying out the present invention will be described in further detail using various embodiments with reference to the accompanying drawings.

First Embodiment

Figure 1:
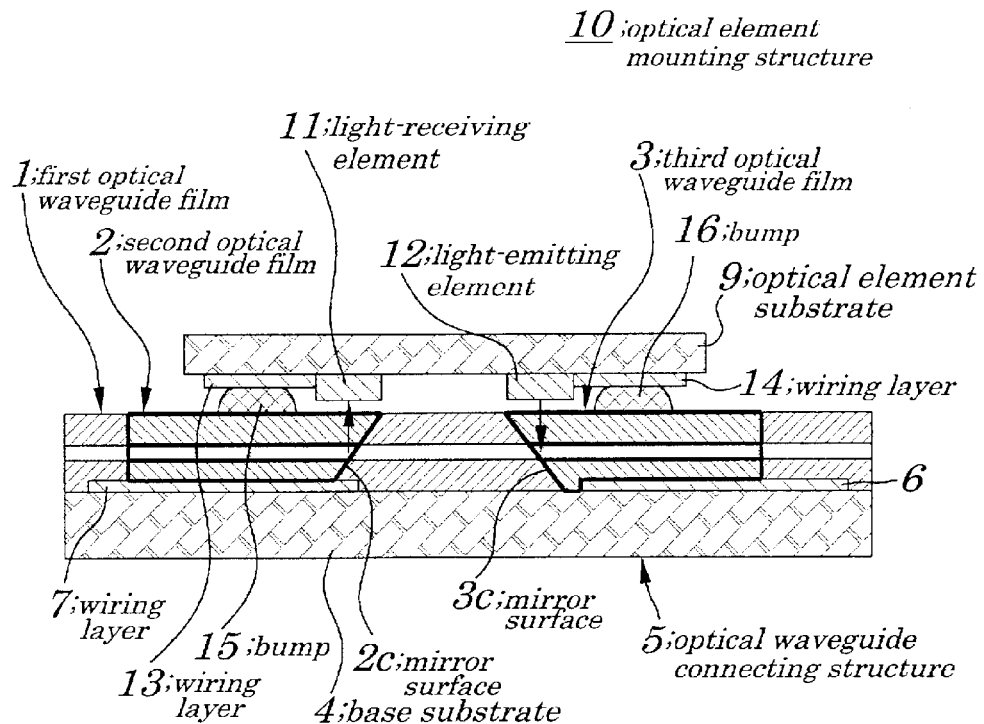
FIG. 1 is a side view showing a constitution of an optical element mounting structure according to a first embodiment of the present invention.
Figure 2:
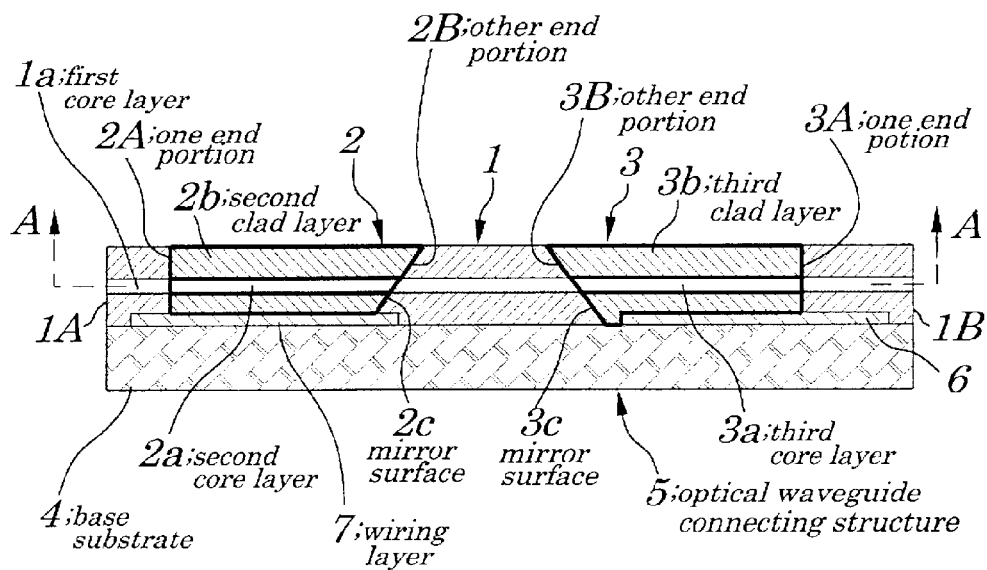
FIG. 2 is a side view showing a constitution of an optical waveguide connecting structure used for assembling the optical element mounting structure according to the first embodiment.
Figure 3:
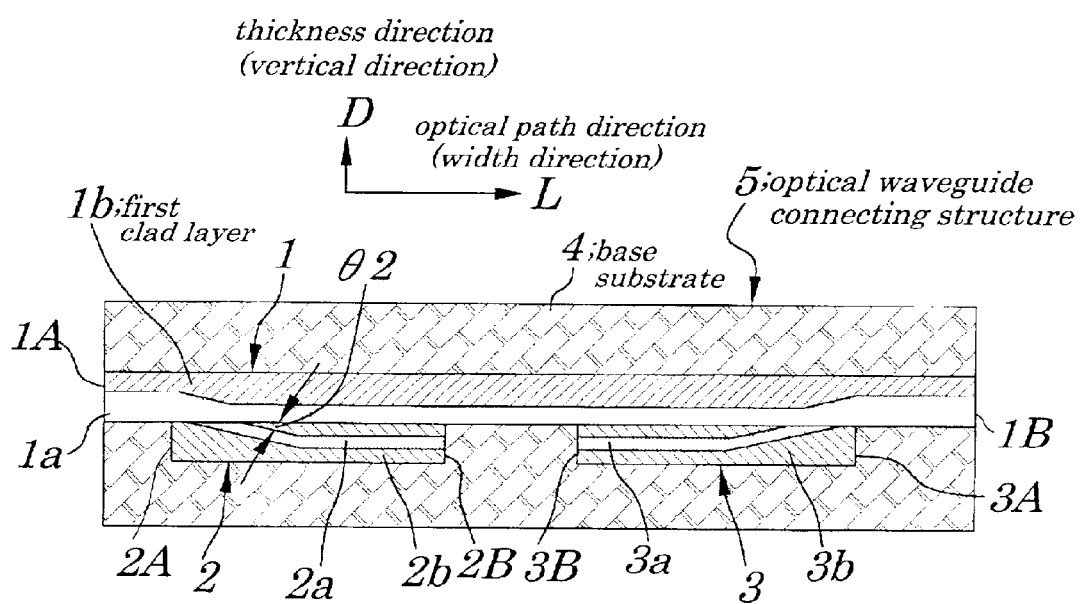
FIG. 3 is a sectional view taken along a line between the arrows A—A in FIG. 2.
Figure 4:
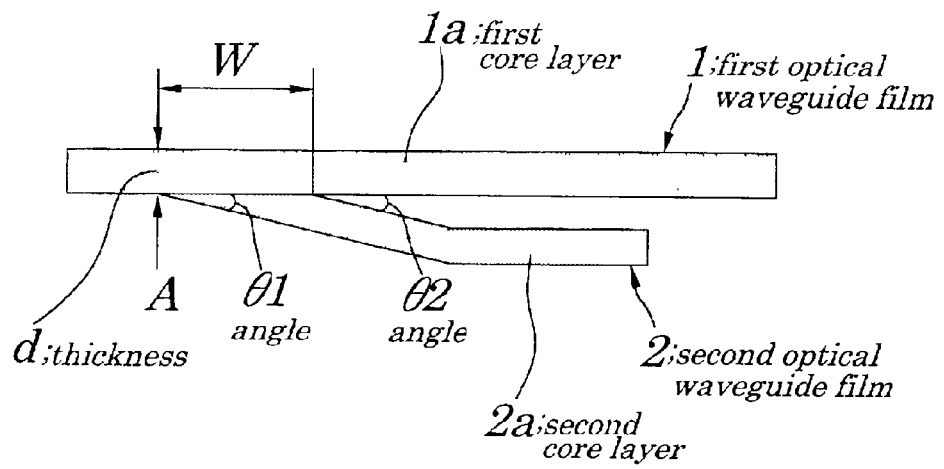
FIG. 4 is a view schematically showing a state in which optical waveguides are jointed to each other in the optical waveguide connecting structure according to the first embodiment.
Figure 5:
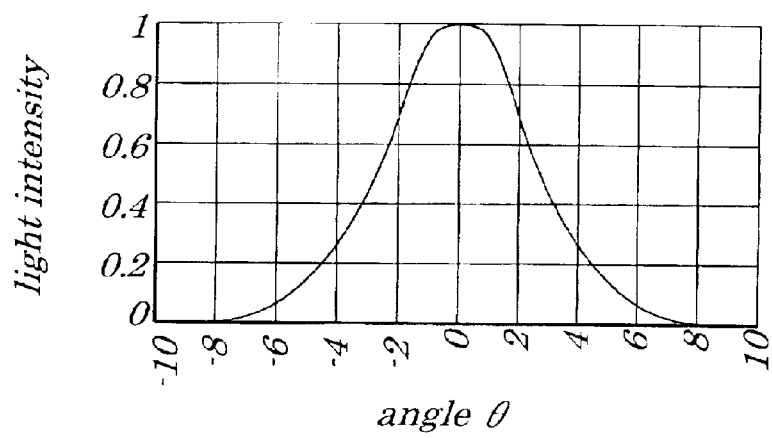
FIG. 5 is a graph showing a relation between an optical waveguide joint angle and a light intensity in the optical waveguide connecting structure according to the first embodiment.

FIG. 1 is a side view showing a constitution of an optical element mounting structure as a first embodiment of the present invention. FIG. 2 is a side view showing a constitution of an optical waveguide connecting structure used to assemble the optical element mounting structure. FIG. 3 is a sectional view taken along a line between arrows A—A in FIG. 2. FIG. 4 is a view schematically showing a state in which optical waveguides are jointed to each other in the optical waveguide connecting structure. FIG. 5 is a graph showing a relation between an optical waveguide joint angle and a light intensity in the optical waveguide connecting structure.

In an optical element mounting structure 10 in this embodiment, as shown in FIG. 1, optical elements such as a light-receiving element 11 and a light-emitting element 12 (planar light emitting element (VCSEL), and a like) connected onto an optical element substrate 9 are mounted by use of an optical waveguide connecting structure 5 prepared in advance.

As shown in FIG. 2 and FIG. 3, the above-described optical waveguide connecting structure 5 has a first optical waveguide film 1, a second optical waveguide film 2, and a third optical waveguide film 3, which are adhered onto a base substrate 4 made of, for example, resin, ceramic, or the like. First, second, and third core layers 1a, 2a and 3a of each of the first to third optical waveguide films 1 to 3 are connected to each other so as to be approximately at a same height.

In the first optical waveguide film 1 as shown in FIG. 2 and FIG. 3, a clad layer 1b covers the first core layer 1a. The first optical waveguide film 1 is cut with a diamond cutter or a like such that a longitudinal section of the first core layer 1a is exposed throughout an entire optical path perpendicularly to a film surface along an optical path direction L (width direction) from one end portion 1A to the other end portion 1B. In the second optical waveguide film 2, the second core layer 2a is covered with a clad layer 2b, and is partially exposed at a position opposing to an exposed surface of the first core layer 1a on a side surface of one end portion 2A. The second core layer 2a is then formed so as to be extended while forming a specified angle at θ2 with the exposed surface of the first core layer 1a from the exposed portion to a halfway portion, and to be extended parallelly to the exposed surface of the first core layer 1a from the halfway portion to an other end portion 2B. The slanting section of the first core layer 1a and the second core layer 2a thereby forms the specified angle θ2 with the optical path direction L. The specified angle θ2 is preferably, but not necessarily, approximately 5° or less. Moreover, a mirror surface 2c is formed on the second core layer 2a at the other end portion 2B by cutting the second optical waveguide film 2 at an angle of about 45° with a thickness direction D (vertical direction).

In the third optical waveguide film 3, almost similarly to the second optical waveguide film 2, the third core layer 3a is covered with a clad layer 3b, and is partially exposed at a position opposing to the exposed surface of the first core layer 1a on a side surface of one end portion 3A. The third core layer 3a is then formed so as to be extended while forming a specified angle at θ2 with the exposed surface of the first core layer 1a from the exposed portion to a halfway portion, and to be extended parallelly to the exposed surface of the first core layer 1a from the halfway portion to an other end portion 3B. Moreover, a mirror surface 3c is formed on the third core layer 3a at the other end portion 3B by cutting the third optical waveguide film 3 at an angle of about 45° with the thickness direction D (vertical direction).

The first core layer 1a of the first optical waveguide film 1 is formed to have a thickness of 8 μm to 12 μm and a width of 50 μm to 200 μm, and the clad layer 1b thereof is formed to have a thickness of 18 μm to 22 μm. The second and third core layers 2a and 3a of the second and third optical waveguide films 2 and 3, as well as each of the clad layers 2b and 3b, are formed to have approximately a same thickness and width values as each of the values regarding the first core layer 1a of the first optical waveguide film 1. Each of the core layers 1a, 2a and 3a and the clad layers 1b, 2b and 3b is made of, for example, ultraviolet curing epoxy resin.

First, the exposed surface of the second core layer 2a on the side surface of the one end portion 2A of the second optical waveguide film 2 is adhered to the exposed surface on the side surface of the first core layer 1a of the first optical waveguide film 1 by an adhesive having approximately a same refractive index as each of the first and second core layers 1a and 2a. Then, the first and second core layers 1a and 2a are connected at a height position where heights thereof are approximately equal to each other perpendicularly to a film surface at a position of the core layer 1a. Next, the exposed surface of the third core layer 3a on the side surface of the one end portion 3A of the third optical waveguide film 3 is also adhered to other positions on the exposed surface of the first core layer 1a of the first optical waveguide film 1 by an adhesive having approximately the same refractive index as each of the first and third core layers 1a and 3a while maintaining the relation that the mirror surfaces 2c and 3c are arranged so as to be opposed to each other. Thus, the first and third core layers 1a and 3a are connected at the identical height position from the film surface. Subsequently, the first to third optical waveguide films 1 to 3 thus united are adhered onto the base substrate 4, on which wiring layers 6 and 7 are formed in advance, thus completing the optical waveguide connecting structure 5.

When constituting the optical waveguide connecting structure 5 as described above, with respect to adhesion in the optical path direction L (width direction), the second and third core layers 2a and 3a are adhered to the first core layer 1a, which is widely exposed along the optical path direction L (width direction). Therefore, since the adhesion can be performed at any position along the optical path direction L (width direction)), highly accurate alignment is not required. Moreover, with respect to the adhesion in the thickness direction D (vertical direction), alignment accuracy on an order of about 1 μm is required. However, the second and third core layers 2a and 3a are adhered to the first core layer 1a while maintaining the first to third core layers 1a, 2a and 3a at the same height by arranging the first to third optical waveguide films 1 to 3 on the base substrate 4. Therefore, the adhesion thereto can be achieved with securing the above-mentioned alignment accuracy. Specifically, by fabricating the clad layers 1b, 2b and 3b on a lower surface of the first to third optical waveguide films 1 to 3 with variation within about 1 μm, and by pressing the lower surfaces of respective first to third optical waveguide films 1 to 3 to the base substrate 4, the above-mentioned alignment accuracy can be secured with the base substrate 4 as a reference surface.

Here, when adhering the optical waveguide film to the base substrate 4 whose surface has the already-formed wiring layers 6, 7, since there exists unevenness in a thickness of the wiring layers 6, 7 on the surface of the base substrate 4, the heights of the first third core layers 1a, 2a and 3a cannot be aligned by adjusting the thickness of the clad layer 1b, 2b and 3b on the lower surface of the first to third optical waveguide films 1, 2 and 3. In such a case, the clad layers 1b, 2b and 3b on the upper surfaces of the first to third optical waveguide films 1 to 3 are manufactured to have a variation in thickness within about 1 μm. An adhesive of an even thickness is applied to the lower surface of the first to third optical waveguide films 1 to 3, with the lower surface facing the base substrate 4, and the first to third optical waveguide films 1, 2 and 3 are placed on the base substrate 4 having the wiring layers 6, 7. Thereafter, the upper surfaces of the first to third optical waveguide films are contacted to a mirror plate, and a pressure is applied from both the base substrate 4 side and the mirror plate side to adhere the first to third optical waveguide films 1, 2 and 3 to the base substrate 4. Thus manufactured, even if there exists unevenness in the thickness due to the wiring layers 6, 7 on the surface of the base substrate 4, since the clad layers 1b, 2b and 3b on the upper surface of the first to third optical waveguide films 1 to 3 can be aligned at the same height by using the mirror plate as a reference surface, the first to third core layers 1a, 2a and 3a can have the identical height, and thus the alignment accuracy can be secured.

Here, with reference to FIG. 4 and FIG. 5, description will be made for a joint angle of the second core layer 2a of the second optical waveguide film 2 with the first core layer 1a of the first optical waveguide film 1. In FIG. 4, the second core layer 2a of the second optical waveguide film 2 (alternatively, the third core layer 3a of the third optical waveguide film 3) diverges from the side surface (exposed surface) of the first core layer 1a of the first optical waveguide film 1 with a light intensity I (optical energy density). The light intensity I is represented by a formula below and depends on an average value θ (=(θ1+θ2)/2) of angles θ1 and θ2, a thickness d of the first core layer 1a and an optical wavelength λ. Note that a symbol W indicates a width of the exposed surface of the second core layer 2a, and the symbol A indicates an end portion of the second core layer 2a.

$$\Omega = (2\times\lambda)/(\pi\times d) \qquad \text{formula (1)}$$

$$I = exp(-2\times(\theta/\Omega)^2) \qquad \text{formula (2)}$$

Ω in formula (1) represents a spread angle of light from an opening (exposed portion) of the first core layer 1a of the first optical waveguide film 1. Assuming that d=10 μm and λ=1.3 μm as one example, Ω is calculated as: Ω≈0.0827 radian≈4.7°.

When calculating I in the formula (2), assuming that θ=2° as one example, I is calculated as: I≈0.7. Assuming also that θ=6° as another example, I is calculated as: I≈0.04.

FIG. 5 shows an relation between the angle θ (abscissa axis) and a light intensity I (optical energy density) based on the foregoing calculation results. As is apparent from FIG. 5, the light intensity becomes reduced as the value of the angle θ increases in positive and negative directions from center, θ=0.

Therefore, when the angle θ becomes equal to or larger than a reference angle of deviation (Ω) obtained by: wavelength λ/width d of the core layer, the amount of diverging light is rapidly decreased. Accordingly, the angle θ is desirably set to a value equal to or less than the angle of deviation (Ω). A reference angle of deviation (Ω) in a single mode becomes about 5° as calculated above. On the other hand, though the width of the core layer becomes as large as about 50 μm in the optical waveguide of a multi-mode, since the light is transmitted through the optical waveguide in various directions, an amount of diverging light can not be calculated using the formulas (1) and (2). However, it is conceivable that a specified amount of the diverging light can be obtained even in the case of the multi-mode if the angle θ is set to about 5° or less, similarly to the angle of deviation of the optical waveguide in the single mode. Moreover, if the wavelength of light is lengthened, the width d of the optical waveguide can be widened accordingly. Thus, the reference angle of deviation (Ω) also becomes about 5° after all. For this reason, the angle θ is preferably set to about 5° or less in any case.

Next, description will be made for the optical element mounting structure 10 of the embodiment with reference to FIG. 1.

As shown in FIG. 1, in the optical element mounting structure 10 in the embodiment, the optical element substrate 9 having the light-receiving element 11 and the light-emitting element 12 of a planar light emitting type connected via wiring layers 13 and 14, is arranged by using the optical waveguide connecting structure 5 having the wiring layers 6 and 7 formed on the base substrate 4. The optical element substrate 9 is arranged such that the light-receiving element 11 as one optical element is opposed to the mirror surface 2c of the second core layer 2a of the second optical waveguide film 2, and at the same time, the light-emitting element 12 as the other optical element is opposed to the mirror surface 3c of the third core layer 3a of the third optical waveguide film 3. The optical element substrate 9 is mounted via bumps 15 and 16.

In order to assemble the optical element mounting structure 10 as described above, the optical element substrate 9 is placed above the base substrate 4, on which the optical waveguide connecting structure 5 is formed, and the light-receiving element 11 and the light-emitting element 12 on the optical element substrate 9 are respectively positioned right above the mirror surface 2c of the second core layer 2a and the mirror surface 3c of the third core layer 3a on the base substrate 4. And then, the base substrate 4 is subjected to a heat treatment to melt the bumps 15 and 16, whereby the optical element substrate 9 is fixed to the base substrate 4, and the optical element mounting structure 10 is completed.

Here, a light reflection effect may be reduced in an interface of a medium having a different refractive index by filling a transparent adhesive between the optical element component and the optical waveguide to make the refractive index of the space therebetween equal to that of the optical waveguide.

When the light-receiving element 11 and the light-emitting element 12 are aligned as describe above, conductive patterns, including conductive patterns of an installation position of alignment of the respective first to third optical waveguide films 1 to 3, are formed in advance on the wiring layers 6 and 7 on the base substrate 4. The first to third optical waveguide films 1 to 3 are first aligned with the conductive patterns, and then the bumps 15 and 16 of the light-receiving element 11 and the light-emitting element 12 are aligned with the conductive patterns.

Here, microlenses may be placed on the surfaces of the light-receiving element 11 and the light-emitting element 12 on the optical element substrate 9, and then emitted and received light may be projected in parallel onto the mirror surface 2c of the second core layer 2a and the mirror surface 3c of the third core layer 3a respectively. Alternatively, microlenses may be placed on the surfaces of the mirror surface 2c of the second core layer 2a and the mirror surface 3c of the third core layer 3a, and then light-emitting and light-receiving windows of each of the light-receiving element 11 and the light-emitting element 12 and the mirror surfaces 2c and 3c may be alternately projected. As described above, by placing the microlenses, spread of incident light to the light-receiving element 11, which is optically coupled with the second and third core layers 2a and 3a of the optical waveguide connecting structure 10 via a space, and spread of outgoing light from the light-emitting element 12 can be prevented.

Furthermore, since the light-receiving element 11 and the light-emitting element 12 can be mounted sufficiently close to the mirror surfaces 2c and 3c of the second and third core layers 2a and 3a respectively, loss of emitted and received light can be inhibited.

As described above, the following effects can be obtained according to the embodiment.

First, optical coupling between the optical waveguides can be easily made with high accuracy. Specifically, the first optical waveguide film 1, the second optical waveguide film 2, and the third optical waveguide film 3 are prepared. Herein, the first optical waveguide film 1 is cut so that the longitudinal section of the first core layer 1a is exposed along the optical path direction; the second optical waveguide film 2 has the second core layer 2a formed, the second core layer 2a being partially exposed at a position opposing to an exposed surface of the first core layer 1a at a section forming an angle θ of about 5° or less with the optical path direction of the first core layer 1a; and the third optical waveguide film 3 has the third core layer 3a formed, the third core layer 3a being partially exposed at a position opposing to an exposed surface of the first core layer 1a. Then, on the base substrate 4, the first to third optical waveguide films 1 to 3 are connected while maintaining the films thereof at approximately the same height from the reference surface which is the exposed surfaces of each of the first to third core layers 1a, 2a and 3a, thus constituting the optical waveguide connecting structure 5.

Second, the optical waveguide is scarcely damaged. Specifically, the exposed surfaces of the first to third core layers 1a to 3a are connected to each other while maintaining the first to third core layers 1a, 2a and 3a at approximately the same height as described above; therefore, the occurrence of unevenness of each of the first to third core layers 1a, 2a and 3a functioning as the optical waveguide is reduced. Thus, the external force is hardly applied thereto.

Third, the optical element can be easily mounted on the base substrate 4. Specifically, by using the above-described optical waveguide connecting structure 5, optical elements such as the light-receiving element 11 and the light-emitting element 12 are mounted so that the elements can perform light emitting and receiving without contacting to the second and third core layers 2a and 3a functioning as optical waveguides of the second and third optical waveguide films 2 and 3. And then, the optical element mounting structure 10 is assembled.

Second Embodiment

Figure 6:
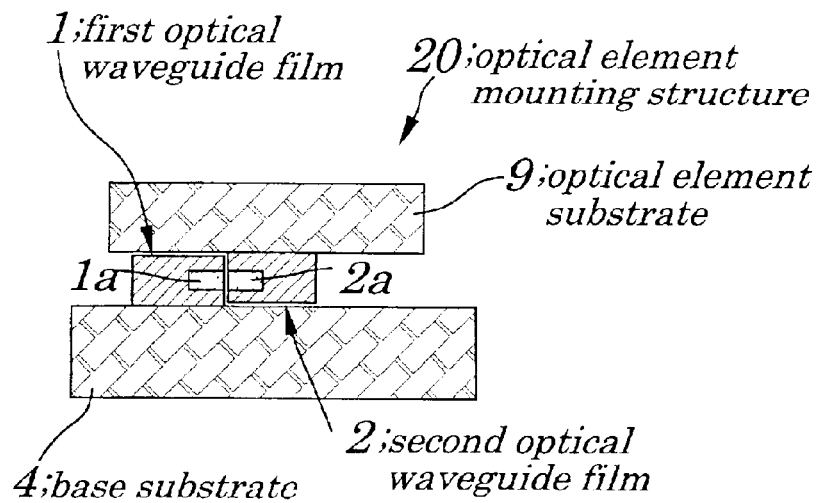
FIG. 6 is a front view showing a constitution of an optical element mounting structure according to a second embodiment of the present invention.
Figure 7:
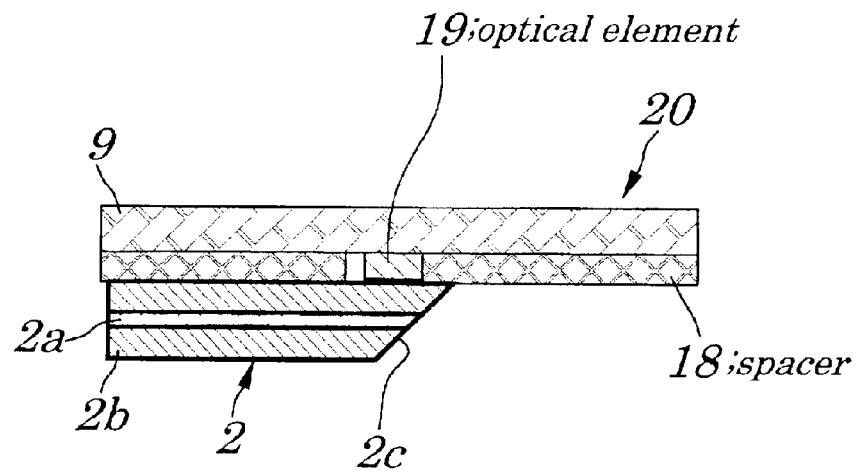
FIG. 7 is a side view showing the constitution of the optical element mounting structure according to the second embodiment.

FIG. 6 is a front view showing a constitution of an optical element mounting structure as a second embodiment of the present invention. FIG. 7 is a side view showing the constitution of the optical element mounting structure. The constitution of the optical element mounting structure of the second embodiment is largely different from that of the first embodiment described above in that the optical waveguide films is also arranged on an optical element substrate, and a base substrate having the optical waveguide films arranged thereon and the optical element substrate are pressed toward each other, thus mounting an optical element.

Specifically, as shown in FIG. 6 and FIG. 7, in an optical element mounting structure 20 of the embodiment, a base substrate 4 having a first optical waveguide film 1 adhered, and an optical element substrate 9 having a second optical waveguide film 2 and a third optical waveguide film 3 (not shown) are adhered via spacers 18, are assembled as follows. The first optical waveguide film 1 is pressed to a surface of the spacers 18 of the optical element substrate 9, of alternatively, the second optical waveguide film 2 is pressed to the surface of a base substrate 4 in such a manner that the first and second core layers 1a and 2a are opposed to each other perpendicularly to the surface of the base substrate 4. A waveguide-type optical element 19 is connected to the optical element substrate 9 between the spacers 18.

In this embodiment, exposed surfaces of the first and second core layers 1a and 2a to be optically coupled are slightly slant sections forming an angle at about 5° or less with the optical path direction of the first and second core layers 1a and 2a, similarly to the first embodiment. These exposed surfaces may be adhered by an adhesive, or may be contacted to each other just by pressing. Both of end portions of the exposed surfaces of first to third core layers 1a to 3a (third core layers 3a is not shown) are formed to be mirror surfaces. Therefore, optical coupling can be sufficiently performed just by making the exposed surfaces contact to each other. Especially, in a case where the exposed surfaces are merely contacted, advantages can be obtained when replacing parts.

The clad layer 1b (not shown) on an upper surface of the first optical waveguide film 1 is formed to have a thickness equal to those of the second and third clad layers 2b and 3b (not shown) on the optical element substrate 9 side of the second and third optical waveguide films 2 and 3 (not shown) so as to align the respective first to third optical waveguide films 1 to 3 in a thickness direction. Alignment in the thickness direction can be easily performed just by pressing the first optical waveguide film 1 to a surface of the spacer 18, the spacer 18 serving as a reference plate. Also, the respective first to third optical waveguide films 1, 2 and 3 may be aligned at a same height by pressing the second and third optical waveguide films 2 and 3 onto the upper surface of the base substrate 4, to which the first optical waveguide film 1 is adhered.

Moreover, a first optical waveguide is not limited to an optical waveguide film. The first optical waveguide may be formed by directly spin-coating a base substrate with resin for constituting a optical waveguide, and then a core layer thereof may be exposed. The slightly slant section to the optical path may be formed with a diamond cutter, and a superfluous portion of the optical waveguide may be removed by an abrasion process using ultraviolet laser. Similarly, a second optical waveguide may also be formed on the optical waveguide substrate by a spin-coat method, and the respective sections of the second optical waveguide may be formed by the diamond cutter or the abrasion process using the ultraviolet laser.

Furthermore, in the embodiment, the base substrate 4 having the first optical waveguide film 1 adhered and the optical element substrate 9 having the second and third optical waveguide films 2 and 3 adhered via spacers 18, are assembled in such a manner that the first optical waveguide film 1 is pressed to the surface of the spacer 18 of the optical element substrate 9, and at the same time, the second optical waveguide film 2 is pressed to the surface of the base substrate 4. Herein, the first to third core layers 1a, 2a and 3a are set to be opposed to each other. Therefore, the optical element can be easily mounted on the base substrate 4.

Third Embodiment

Figure 8:
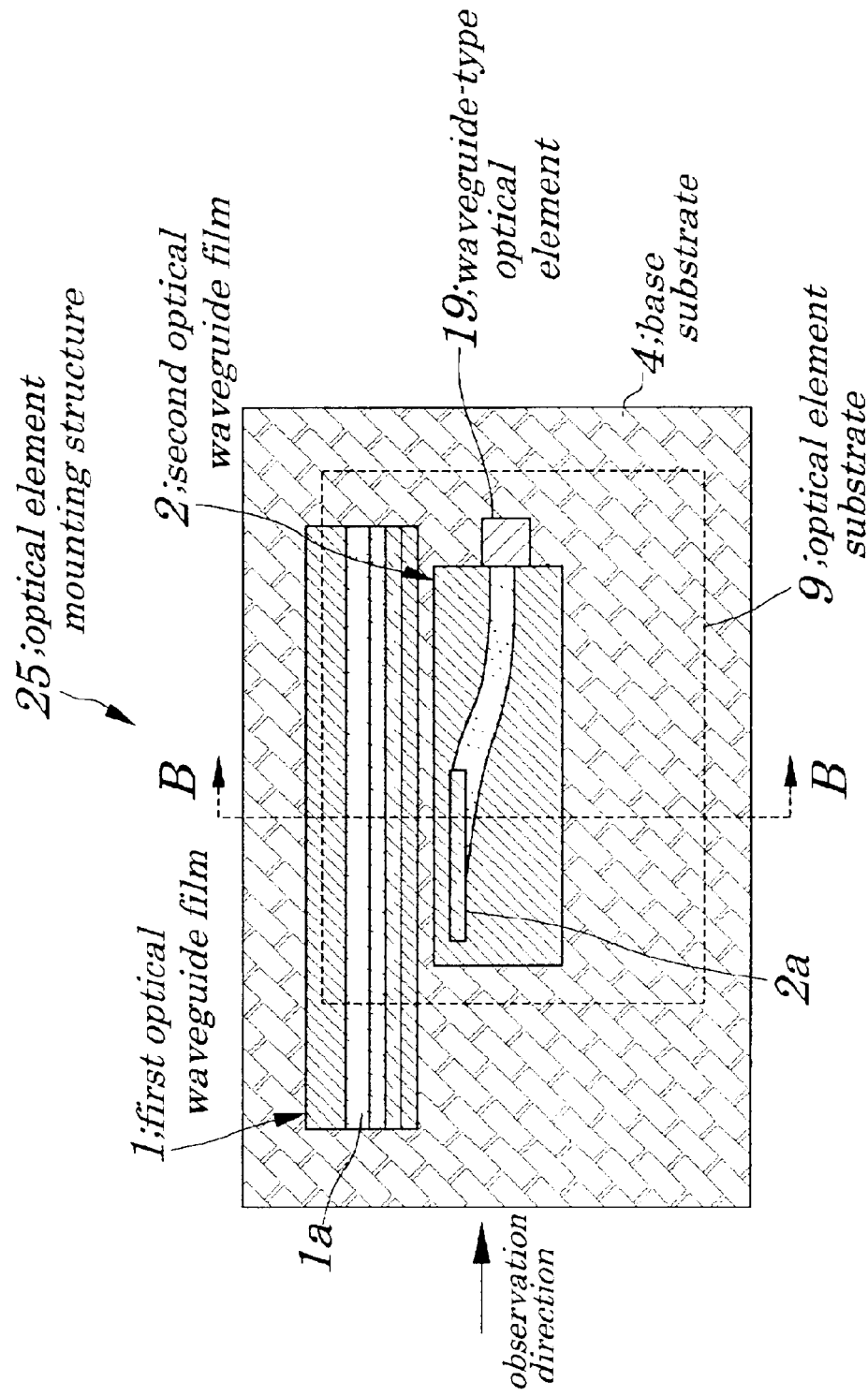
FIG. 8 is a plan view showing a constitution of an optical element mounting structure according to a third embodiment of the present invention.
Figure 9:
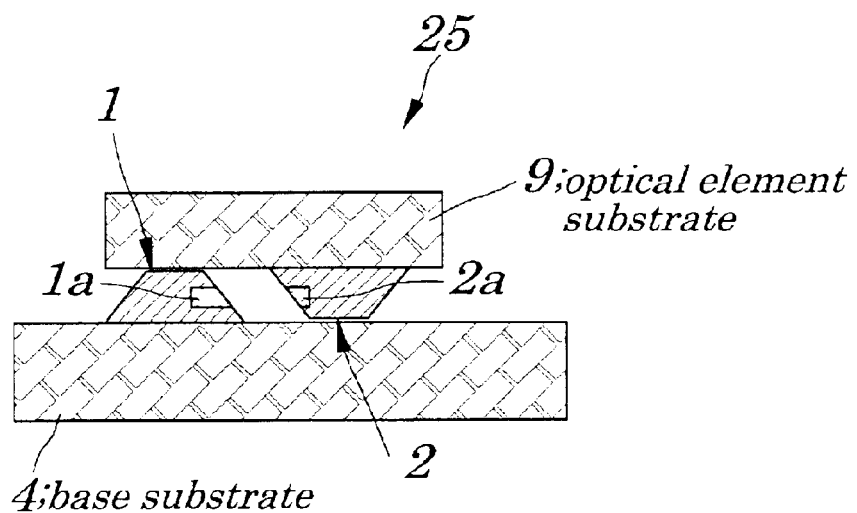
FIG. 9 is a sectional view taken along a line between arrows B—B in FIG. 8.
Figure 10:
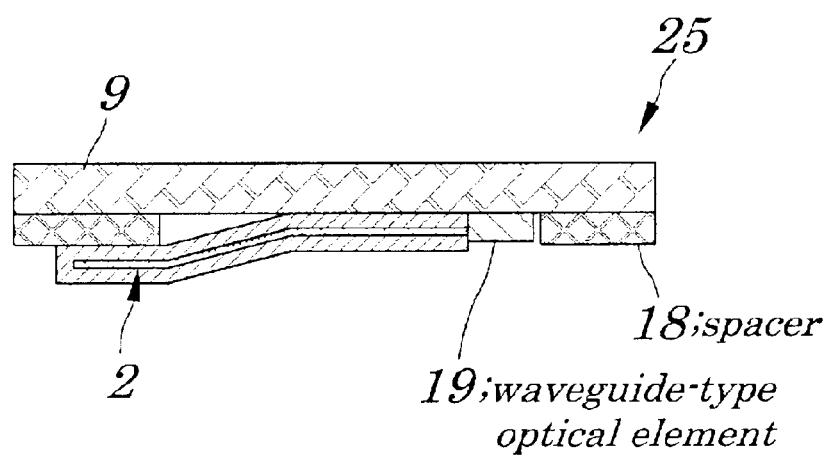
FIG. 10 is a side view showing the constitution of the optical element mounting structure according to the third embodiment.

FIG. 8 is a plan view showing a constitution of an optical element mounting structure as a third embodiment of the present invention. FIG. 9 is a sectional view taken along a line between arrows B—B. FIG. 10 is a side view showing the constitution of the optical element mounting structure. The constitution of the optical element mounting structure of the third embodiment is largely different from that of the second embodiment described above in that core layers of optical waveguide films are opposed to each other at slant surfaces thereof.

Specifically, as shown in FIGS. 8 to 10, in an optical element mounting structure 25 of the third embodiment, a base substrate 4 having a first optical waveguide film 1 adhered, and an optical element substrate 9 having a second optical waveguide film 2 and a third optical waveguide film 3 (not shown) adhered via spacers 18, are assembled. Herein, the first optical waveguide film 1 is pressed to a surface of the spacers 18 of the optical element substrate 9, and at a same time, the second optical waveguide film 2 is pressed to a surface of the base substrate 4 in such a manner that first and second core layers 1a and 2a are set to be opposed to each other at slant surfaces thereof.

Moreover, the second core layer 2a of the second optical waveguide film 2 is exposed in cross section perpendicular to an optical path at one end thereof. The second core layer exposed on the cross section is opposed to a light-emitting window or a light-receiving window of a waveguide-type optical element 19, thus making an optical coupling.

In the embodiment, as apparent from FIG. 9, exposed surfaces of the first and second core layers 1a and 2a are slightly slant sections forming an angle at about 5° or less with an optical path direction of the first core layer 1a, similarly to the first embodiment. Such sections are opposed to each other at the slant surfaces thereof slanting with the base substrate 4. Therefore, areas of the exposed surfaces of the core layers 1a and 2a of the first and second optical waveguide films 1 and 2 are increased. And, both of the exposed surfaces of the first and second core layers 1a and 2a are stacked and aligned while checking position thereof by observing from above. Accordingly, the first and second core layers 1a and 2a can be aligned while checking alignment accuracy, which allows a safety margin for the alignment accuracy and process accuracy of components.

Additionally, alignment of the respective first to third optical waveguide films 1 to 3 in a thickness direction can be performed almost similarly to the second embodiment.

As described above, almost a same effect as described in the second embodiment can be obtained also in this embodiment.

In addition, according to this embodiment, since the alignment can be performed while observing the exposed surfaces of the respective core layers from above to check the position thereof, the alignment with high accuracy can be performed with a safety margin.

Fourth Embodiment

Figure 11:
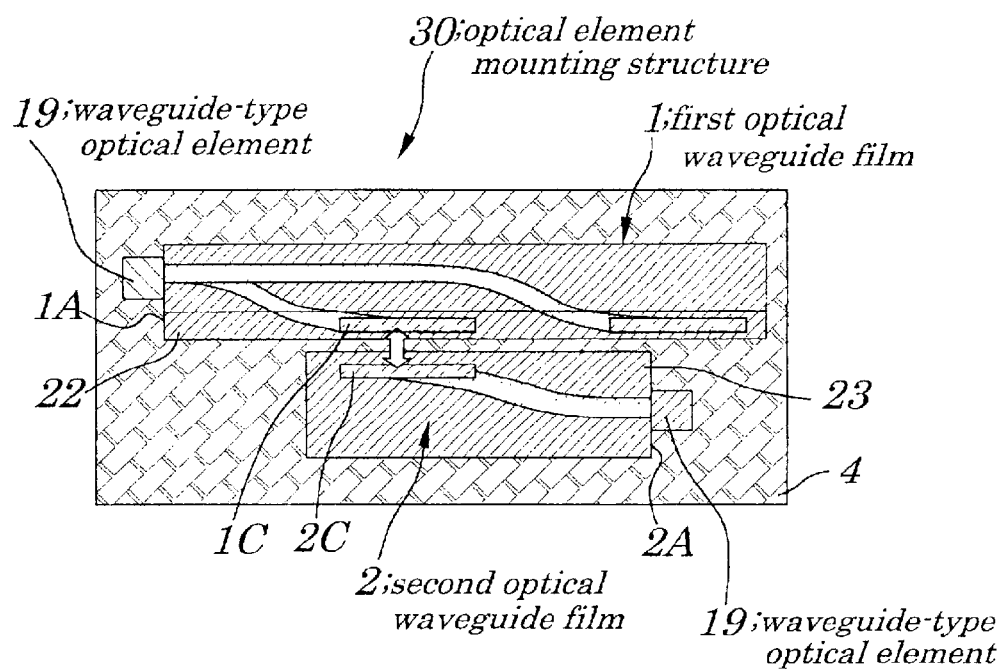
FIG. 11 is a plan view showing a constitution of an optical element mounting structure according to a fourth embodiment of the present invention.
Figure 12:
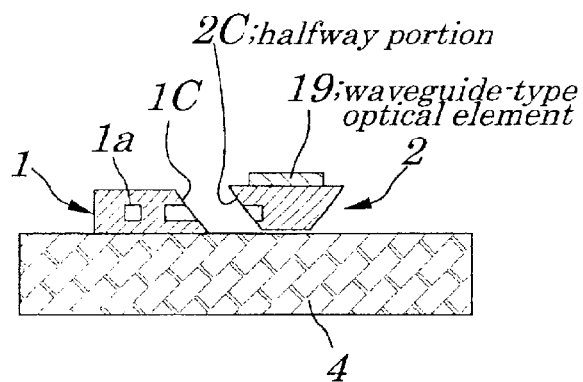
FIG. 12 is a front view showing the constitution of the optical element mounting structure according to the fourth embodiment.

FIG. 11 is a plan view showing a constitution of an optical element mounting structure as a fourth embodiment of the present invention. FIG. 12 is a front view showing the constitution of the optical element mounting structure. The constitution of the optical element mounting structure of the fourth embodiment is largely different from that of the first embodiment described above in that optical elements are directly mounted on a base substrate. Also, in the fourth embodiment, a characteristic of the present invention is represented as a more general form, in which an optical waveguide is cut in a section slightly slant with an optical path direction at about 5° or less to expose a core layer, core layers are aligned at a same height by providing optical waveguide films having such a section on a common reference surface, and then the core layers are stacked in the sections thereof, thus making an optical coupling.

Specifically, as shown in FIG. 11 and FIG. 12, an optical element mounting structure 30 of the embodiment, a waveguide-type optical element 19 is adhered to a first core layer 1a at the one end portion 1A of a first optical waveguide film 1 on a base substrate 4, and at a halfway portion 1C of a slant surface 22 formed along an optical path direction, the first core layer 1a crosses the slant surface 22 at an angle of about 5° or less with a direction of the slant surface, thus exposing a section of the first core layer 1a in the section. If a crossing angle is set to be 5° or less, an amount of diverging light from another optical waveguide contacting at the section can be sufficiently obtained, similarly to the first embodiment. Also, since a length of the section is enlarged eleven times as large as that of the cross section perpendicular to the optical path, crossing for the alignment of the sections in this direction can be made with one digit higher margin. Similarly, the waveguide-type optical element 19 is adhered to a second core layer 2a at one end portion 2A of second optical waveguide film 2. Meanwhile, at a halfway portion 2C of a slant surface 23 formed along the optical path direction, the second core layer 2a crosses the slant surface 23 at an angle of about 5° or less with a direction of the slant portion, thus exposing a section of the second core layer 2a in the section. Then, exposed surfaces of the respective first and second core layers 1a and 2a are adhered as shown by an arrow in FIG. 11 to assemble the optical element mounting structure 30.

Moreover, in the embodiment, an example where the second optical waveguide film 2 is adhered to the waveguide-type optical element 19 was described. However, the optical element is not limited to the waveguide-type optical element 19 in the invention. In a case where a planar light emitting element (VCSEL) or optical an element of a planar-light-emitting type is used instead of the waveguide-type optical element 19, structure of the second embodiment shown in FIG. 7 is employed, but spacers 18 and the an optical element substrate 9 are removed therefrom. Then, a mirror surface is formed on one end portion 2A of the second core layer 2a by cutting the second optical waveguide film 2 at an angle of about 45° with a thickness direction. Thereafter, a light-emitting surface or a light-receiving surface of the optical element 19 is adhered to the surface of the second optical waveguide film 2 at the end of the optical path which is turned almost at 90° angle by total reflection on the mirror surface.

As described above, according to the embodiment, since the optical element 19 united with the first optical waveguide film 1 and the optical element 19 united with the second optical waveguide film 2 can be optically coupled directly on the base substrate 4, a simple optical element mounting structure can be assembled.

Fifth Embodiment

Figure 13:
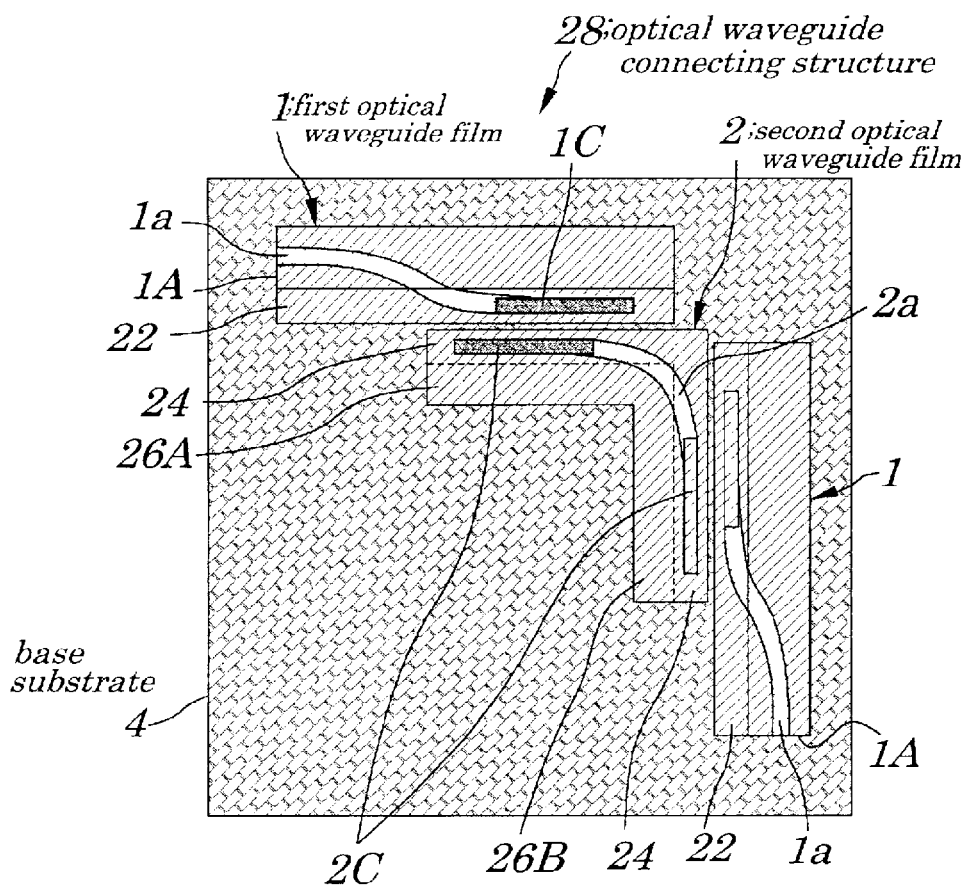
FIG. 13 is a plan view showing a constitution of an optical waveguide connecting structure used in an optical element mounting structure according to a fifth embodiment of the present invention.
Figure 14:
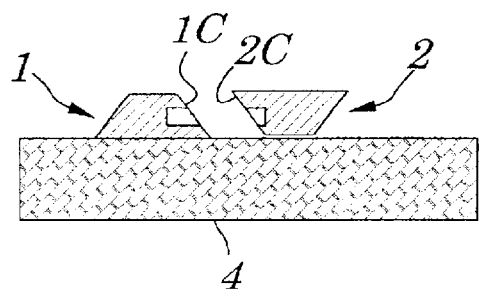
FIG. 14 is a side view showing the constitution of the optical waveguide connecting structure according to the fifth embodiment.

FIG. 13 is a plan view showing a constitution of an optical waveguide connecting structure used in an optical element mounting structure as a fifth embodiment of the present invention. FIG. 14 is a side view showing the constitution of the optical waveguide connecting structure. The constitution of the optical waveguide connecting structure of the fifth embodiment is largely different from that of the first embodiment described above in that a pair of optical waveguide films and an other optical waveguide film are combined to turn a direction of an optical path of a waveguide almost at 90° angle.

Specifically, an optical waveguide connecting structure 28 of the embodiment is constituted as shown in FIG. 13 and FIG. 14. That is, on a base substrate 4, a pair of first optical waveguide films 1 are arranged so as to be shifted from each other at almost a 90° angle. In each of the first optical waveguide films 1, a first core layer 1a extending from one end portion 1A in an optical path direction is exposed on a slightly slant section at a halfway portion 1C of a slant surface 22 formed at a slight angle of about 5° with the optical path direction. Furthermore, on the base substrate 4, the second optical waveguide film 2 is arranged. Herein, a first linear side 26A opposing to one of the first optical waveguide films 1 and a second linear side 26B opposing to an other first optical waveguide film 1 are united, a slant surface 24 is formed so as to correspond to the respective slant surfaces 22 of the pair of the first optical waveguide films 1, and a second core layer 2a is exposed on a slightly slant section at a halfway portion 2C of respective slant surfaces 24. Then, exposed surfaces of the pair of the first core layers 1a and the second core layer 2a positioned therebetween are connected to make an optical coupling.

Here, in a case of an optical waveguide of a single mode, the second core layer 2a of the second optical waveguide film 2 is formed in the shape of a strip line having a thickness of about 10 μm. Then, the optical path is gradually curved to change direction with a curvature of radius more than 500 times as large as a width of the second core layer 2a. Specifically, the optical path changes direction with the radius of curvature of about 5 mm.

According to the fifth embodiment, by applying the embodiment to a purpose of changing the optical path direction almost at a 90° angle between the optical waveguides arranged adjacent to each other, the optical path direction of optical signals transmitted through the first core layer 1a of one of the first optical waveguide films 1 is changed almost at 90° angle by a function of the core layer 2a of the second optical waveguide film 2, and thus optical signals are transmitted to the first core layer 1a of the other first optical waveguide film 1.

In this case, if the exposed surfaces of the first and second core layers 1a and 2a of the first and second optical waveguide films 1 and 2 are connected in a similar manner as a case of an optical waveguide connecting structure 5 described in the first embodiment, alignment can be easily performed. That is, with respect to connection of exposed surfaces of the first and second core layers 1a and 2a described above in a thickness direction, alignment accuracy on an order of about 1 μm is required. However, in the exposed surface forming a slight angle (Δθ) with the optical path direction of the first core layer 1a, alignment accuracy is eased as described below.

Specifically, the error in alignment upon making the exposed surfaces of both first and second core layers 1a and 2a contact with each other is caused only in the two directions in the aligned surfaces. However, as described in the first embodiment, the alignment of the respective first and second optical waveguide films 1 and 2 can be easily realized by arranging the first and second optical waveguide films 1 and 2 having the approximately a same thickness on the base substrate 4.

Furthermore, in a direction along a cut line of the first and second optical waveguide 1 and 2, necessary alignment accuracy is (1/Δθ). As one example, in the case where Δθ=1/200, the alignment accuracy in the direction is made to be eased to about 200 μm. With this alignment accuracy, the alignment of the first and second optical waveguide films 1 and 2 with the base substrate 4 can be easily realized.

As described above, according to the optical waveguide connecting structure 28 of the embodiment, the pair of first optical waveguide films 1, in which the first core layers 1a extending from the one end portion 1A in the optical path direction is partially exposed, are arranged so as to be shifted from each other at almost a 90° angle, and the slant surfaces 24 are formed so as to correspond to the slant surfaces 22 of the first optical waveguide films 1. The second optical waveguide film 2 is arranged, in which the second core layer 2a is partially exposed on the slightly slant section at about 5° at the halfway portion 2C of each of the slant surfaces 24. Thus, the exposed surfaces of the first and second core layers 1a and 2a are connected. Therefore, direction of optical signals transmitted through the first core layer 1a can be easily changed almost at the 90° angle.

Sixth Embodiment

Figure 15:
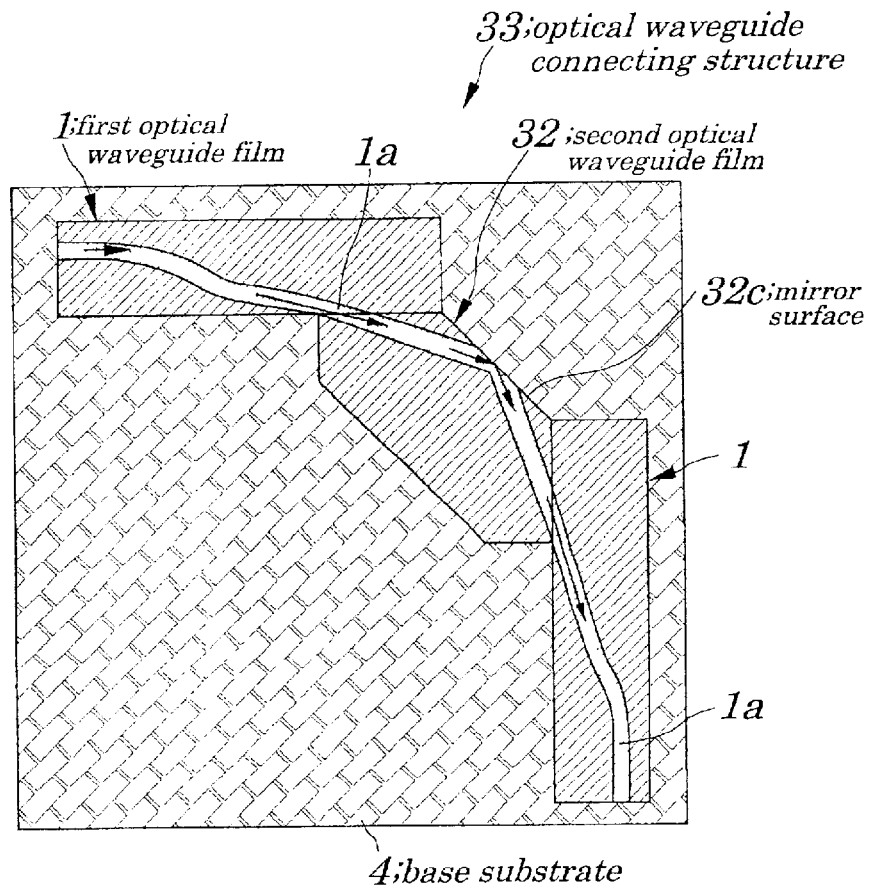
FIG. 15 is a plan view showing a constitution of an optical waveguide connecting structure used in an optical element mounting structure according to a sixth embodiment of the present invention.
Figure 16:
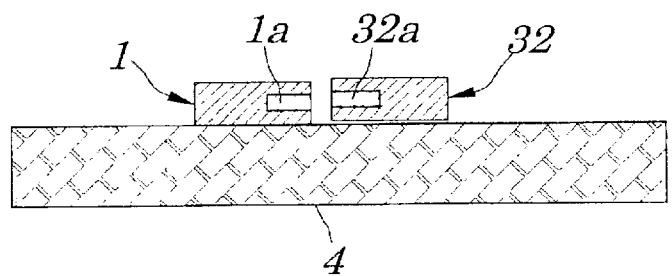
FIG. 16 is a side view showing the constitution of the optical waveguide connecting structure according to the sixth embodiment.

FIG. 15 is a plan view showing a constitution of an optical waveguide connecting structure used in an optical element mounting structure as a sixth embodiment of the present invention. FIG. 16 is a side view showing the constitution of the optical waveguide connecting structure. The constitution of the optical waveguide connecting structure of the sixth embodiment is largely different from that of the fifth embodiment described above in that a mirror surface for totally reflecting and returning an optical path is formed on a middle optical waveguide film to form an optical waveguide for optical signals made incident to and emitted from the mirror surface.

Specifically, as shown in FIG. 15 and FIG. 16, in an optical waveguide connecting structure 33 in the embodiment, a mirror surface 32c for totally reflecting optical signals is formed at a halfway position of a core layer 32a of a second optical waveguide film 32 arranged between a pair of first optical waveguide films 1, the core layer 32a functioning as an optical waveguide for allowing the optical signals to be made incident and emitted.

As described above, when the optical path direction is changed by totally reflecting the optical signals using the mirror surface 32c, it becomes unnecessary to change the direction of the core layer 32a with a gentle radius of curvature unlike the fifth embodiment. Therefore, the dimensions of the second optical waveguide film 32 can be reduced.

Specifically, in the fifth embodiment, in order to return the optical signals with little loss, an optical waveguide film of a strip line shape must be gradually curved to change the optical path with the curvature of radius more than 500 times as large as the width of the strip line shape. Thus, in a case of using an optical waveguide of a single mode, and setting a width dimension of the strip line shape to be about 10 μm for example, radius of curvature of about 5 mm is required to change the direction of the optical path, and the second optical waveguide film 2 must be made large enough to accommodate the curved portion of the strip line shape. Therefore, in the fifth embodiment, dimensions of the second optical waveguide film 2 are inevitably large.

In this respect, in the embodiment, the mirror surface 32c is formed at the halfway position of the second optical waveguide film 32 arranged between the pair of the first optical waveguide films 1, and the optical path direction is changed by totally reflecting the optical signals by using the mirror surface 32. Therefore, the dimensions of the second optical waveguide film 32 may be about 5 mm or less, thus enabling the dimensions of the second optical waveguide film 32 to be made small.

As describe above, according to the optical waveguide connecting structure 33 of the embodiment, a mirror surface 32c for totally reflecting the optical signals is formed at a halfway position of the core layer 32a of the second optical waveguide film 32 arranged between the pair of the first optical waveguide films 1, the core layer 32a functioning as the optical waveguide for allowing the optical signals to be made incident and emitted. The optical path direction is change by totally reflecting the optical signals using the mirror surface 32c. Therefore, the optical path direction can be changed without increasing the dimensions of the second optical waveguide film 32.

Seventh Embodiment

Figure 17:
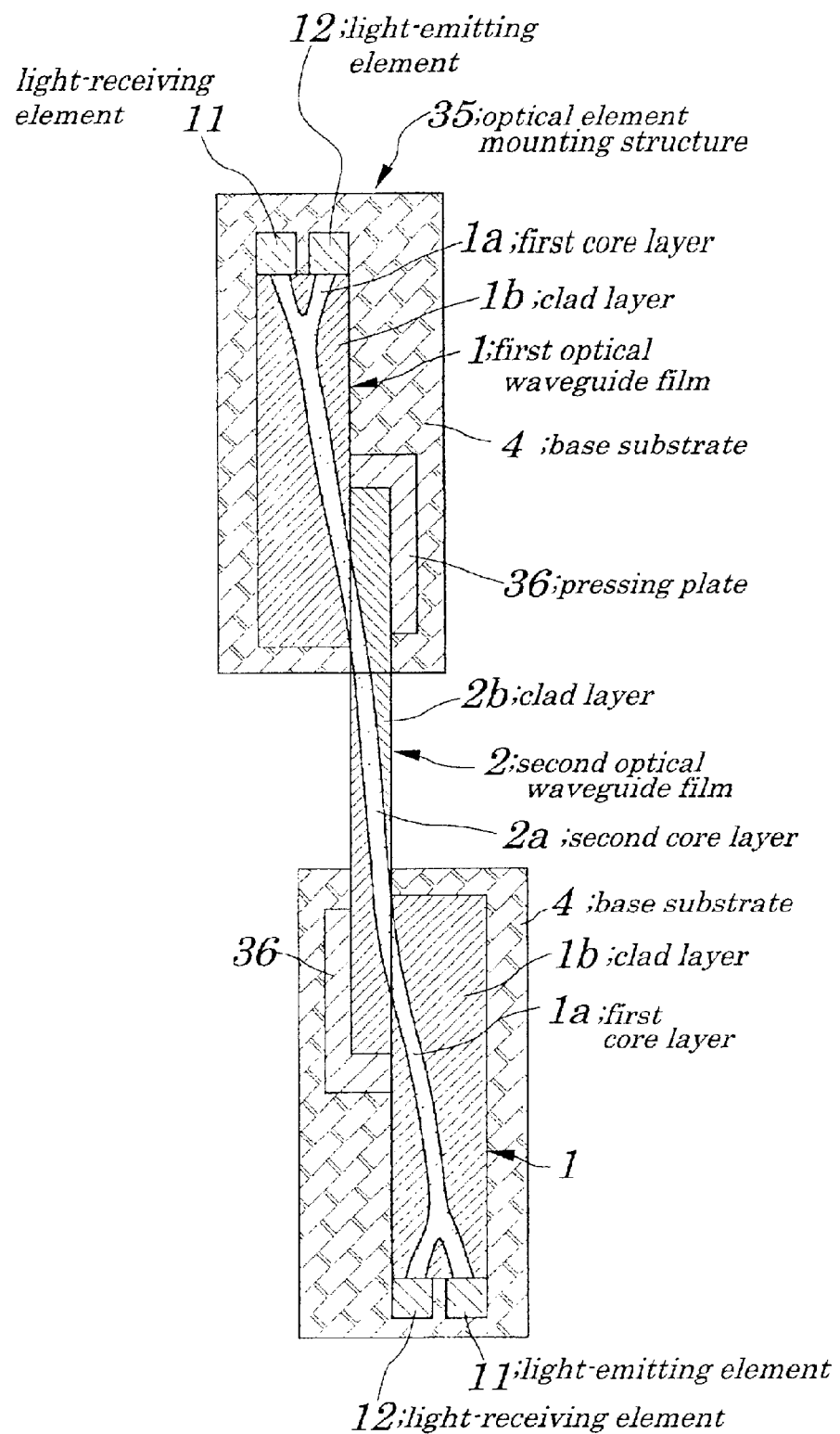
FIG. 17 is a plan view showing a constitution of an optical element mounting structure according to a seventh embodiment of the present invention.

FIG. 17 is a plan view showing a constitution of an optical element mounting structure as a seventh embodiment of the present invention. The constitution of the optical element mounting structure of the seventh embodiment is largely different from that of the first embodiment described above in that each of base substrates, on which an optical waveguide film having an optical element mounted thereon is arranged, is connected to unite each other via an other optical waveguide film.

Specifically, as shown in FIG. 17, in an optical element mounting structure 35, a pair of base substrates 4, on which first optical waveguide films 1 each having a light-receiving element 11 and a light-emitting element 12 adhered to a first core layer 1a are arranged, and a second optical waveguide film 2 are prepared. Exposed surfaces of first and second core layers 1a and 2a are formed in a slant surface forming an angle at about 5° or less with an optical path direction, and both the base substrates 4 are united and assembled by aligning exposed surfaces.

In this case, the exposed surfaces of the first and second core layers 1a and 2a may be pressed toward each other using pressing plates 36 to perform alignment more easily. Note that, the alignment may be performed by adhering using an adhesive, or alternatively, by applying pressure to make the exposed surfaces contact with each other.

Here, a mirror plate (not shown) functioning as a reference surface for a height alignment of optical waveguides may be adhered in advance to an upper surface of the second optical waveguide film 2. The mirror plate is formed so as to cover a joint portion of the first optical waveguide film 1 connecting to the second optical waveguide film 2 and to be pressed to an upper surface of the first optical waveguide film 1. This mirror plate serving as the reference plate is pressed to the first optical waveguide film 1, and thus the second optical waveguide film 2 adhered to the mirror plate may be aligned with the first optical waveguide film 1 at the same height.

As described above, according to the optical element mounting structure 35 of the embodiment, the pair of the base substrates 4, on which the first optical waveguide films 1 each having the optical element adhered to the first core layer 1a are arranged, are united by using the second optical waveguide film 2 while aligning the exposed surfaces of the first and second core layers 1a and 2a. Therefore, optical coupling between the first optical waveguide films 1 on both the base substrates 4 can be easily made.

Eighth Embodiment

Figure 18:
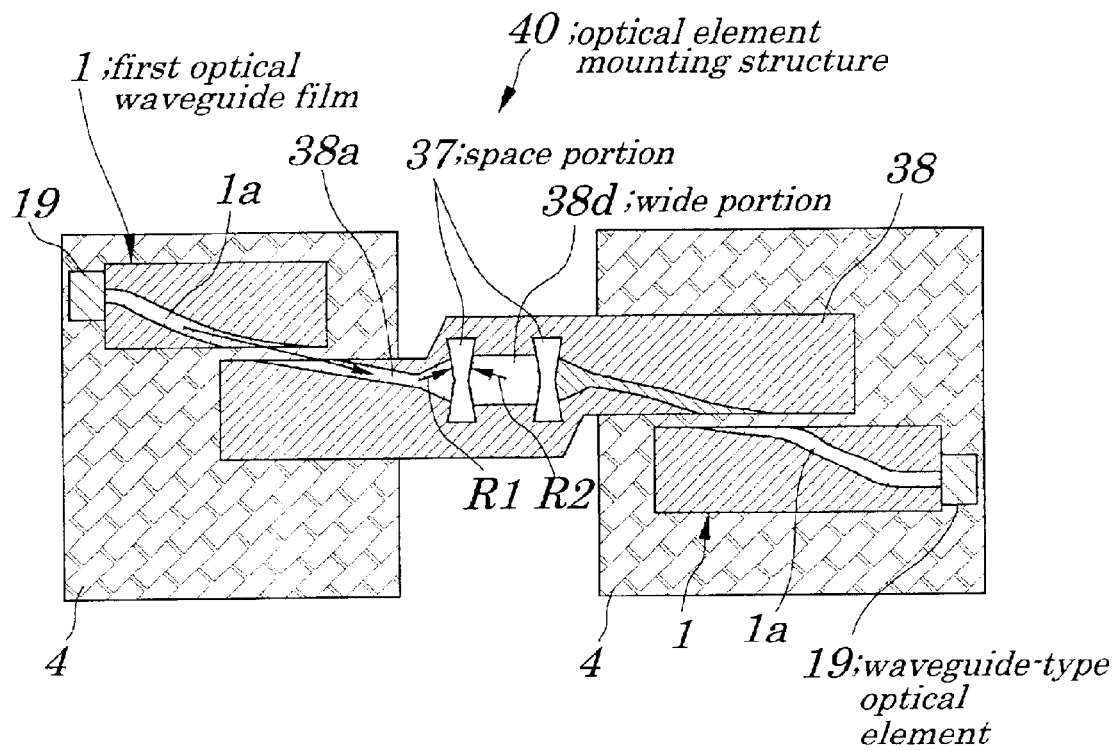
FIG. 18 is a plan view showing a constitution of a method for mounting an optical module according to an eighth embodiment of the present invention.
Figure 19:
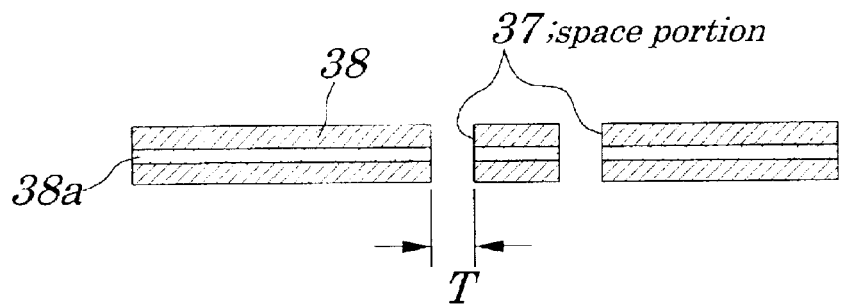
FIG. 19 is a plan view showing an optical tip structure with an optical waveguide terminal used for the method for mounting the optical module according to the eighth embodiment.

FIG. 18 is a plan view showing a constitution of an optical element mounting structure as an eighth embodiment of the present invention. FIG. 19 is a side view showing the constitution of the optical element mounting structure. The constitution of the optical element mounting structure of the eighth embodiment is largely different from that of the seventh embodiment described above in that space portions having a lens function are provided inside the second optical element film.

Specifically, as shown in FIG. 18, in an optical element mounting structure 40 of the embodiment, base substrates 4, on which first optical waveguide films 1 each having a light-receiving element 11 (not shown) and a light-emitting element 12 (not shown) adhered to a first core layer 1a are arranged, are united and assembled by using a second optical waveguide film 38 provided with space portions 37 having the lens function inside. Herein, exposed surfaces of first and second core layers 1a and 38a are formed in slant surfaces forming an angle at about 5° or less with the optical path direction of the first core layer 1a (second core layer 38a), and the exposed surfaces thereof are aligned with each other.

A wide portion 38d for spreading a beam of light is formed inside a core layer 38a of the second optical waveguide 38. Here, if a width of a normal core layer is defined as width (w1) at end portions of the wide portion 38d, a width of the wide portion 38d (w2) is obtained by widening the width (w1) in a shape of a taper. A length Lt of the taper portion is obtained by the formula (3):

$$Lt \geq w1 \times w2 \times \pi/(4 \times \lambda) \qquad \text{formula (3)}$$

Note that, $\lambda$ indicates a wavelength of light transmitting through the optical waveguide.

As one example, in the case where $\lambda=3$ $\mu$m, assuming that the width w1 of the normal core layer=10 $\mu$m and the width w2 of the wide portion 38d=100 $\mu$m, Lt$\geq$0.6 mm is obtained.

Then, the space portions 37 are provided at portions where each of the taper portions and the wide portion 38d are connected. The space portions 37 are located with an interval of 10 to 100 $\mu$m therebetween, and are formed such that the shape of the space forms a cylindrical concave-lens-shaped interface. Assuming that a radius of curvature of each concave lens formed by the space portions 37 are R1 and R2, values of the R1 and R2 are set so as to satisfy the formula (4):

$$((1/R1)+(1/R2))=(4 \times \lambda)/((N-1) \times \pi \times w1 \times w2)) \qquad \text{formula (4)}$$

Note that, N indicates a refractive index of the optical waveguide.

(in a case of polyimide used generally, N=1.5)

As one example, if the formula (4) is calculated assuming that the N=1.5, w1=10 $\mu$m and w2=100 $\mu$m, ((1/R1)+(1/R2))=1/0.3 mm can be obtained.

Therefore, a solution can be obtained that the radius of curvature on the both sides of the space portions 37 is R1=R2 =0.6.

With the constitution described above, the optical signals transmitted as shown by the arrows from the core layer 1a of the one first optical waveguide film 1 to the core layer 38a of the second optical waveguide film 38 are converted into a parallel beam by a lens function of the space portions 37 when reaching, for example, the left space portion 37 of FIG. 18. Then, the parallel beam is transmitted to the right space portion 37 through the wide portion 38d. Thereafter, the parallel beam is converted back to the original beam of light due to the lens function of the right space portion 37, is then transmitted to the first core layer 1a of the other first optical waveguide film 1.

As described above, the beam of light is temporarily drawn into the space portion 37, whereby influences due to foreign matters can be avoided even if such foreign matters are mixed into the first and second core layers 1a and 2a of the first and second optical waveguide films 1 and 2. Therefore, attenuation of light can be reduced, and thus optical transmission can be performed with high quality.

As described above, according to the optical element mounting structure 40 of the embodiment, the base substrates 4, on which the first optical waveguide films 1 each having optical elements 19 adhered to the first core layer 1a are arranged, are united by using the second optical waveguide film 38 provided therein with the space portions 37 having the lens function. In this case, since the exposed surfaces of the first and second core layers 1a and 2a are aligned with each other, upon uniting the base substrates 4, the attenuation of light can be reduced by the space portions 37, and thus the optical transmission can be performed with high quality.

Ninth Embodiment

Figure 20:
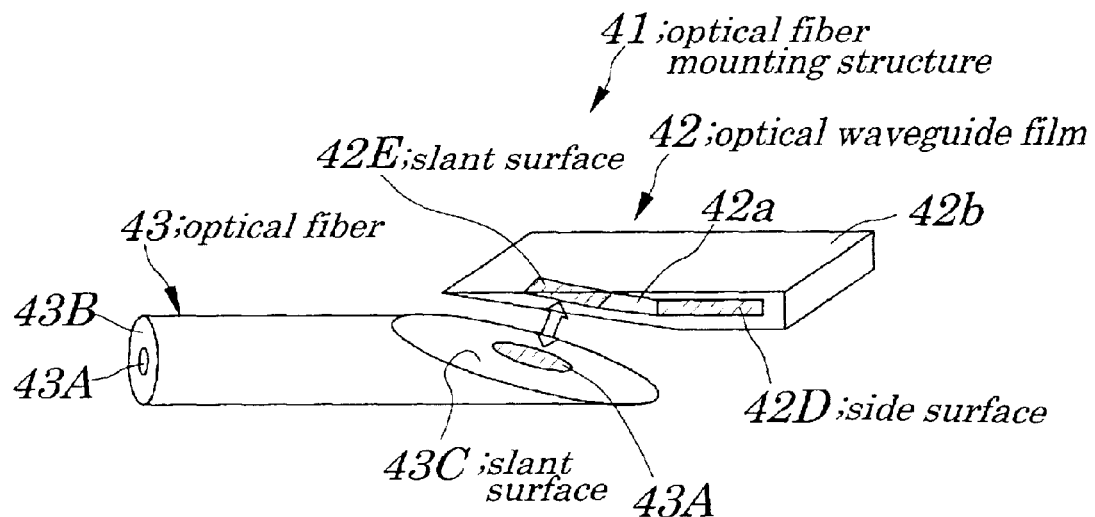
FIG. 20 is a perspective view showing a constitution of an optical fiber mounting structure according to a ninth embodiment of the present invention.
Figure 21:
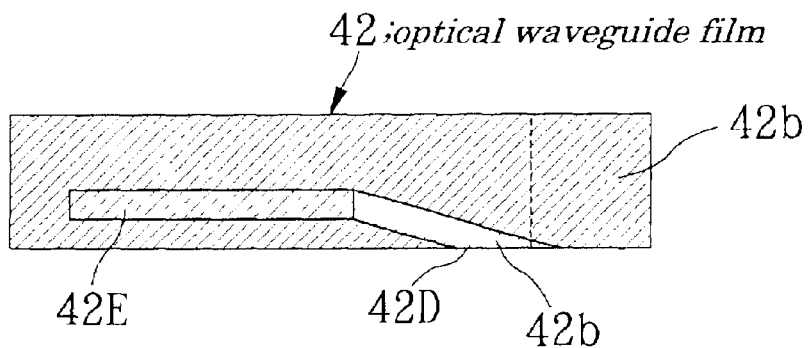
FIG. 21 is a plan view showing the optical fiber mounting structure according to the ninth embodiment.
Figure 22:
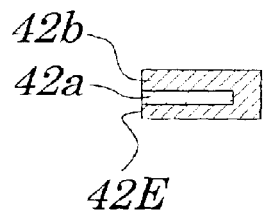
FIG. 22 is a front view showing the optical fiber mounting structure according to the ninth embodiment.
Figure 23:
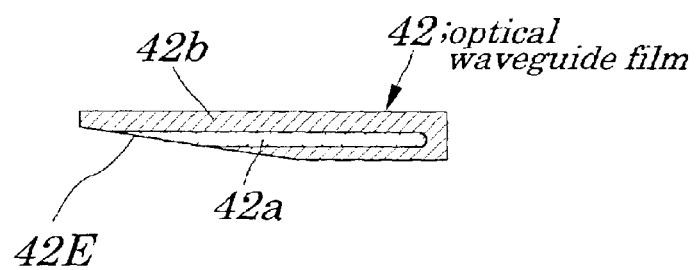
FIG. 23 is a side view showing the optical fiber mounting structure according to the ninth embodiment.
Figure 24:
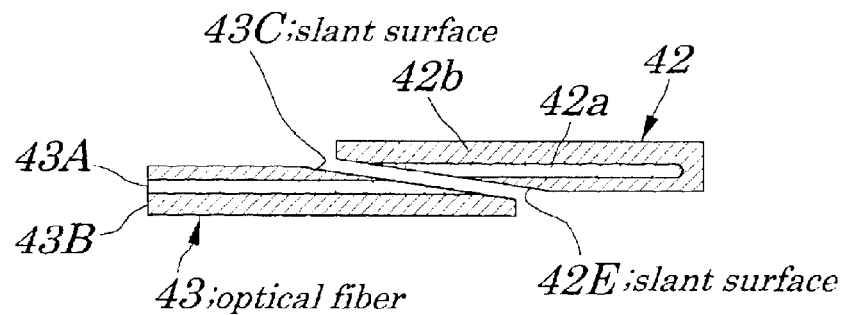
FIG. 24 is another side view showing the optical fiber mounting structure according to the ninth embodiment.
Figure 25:
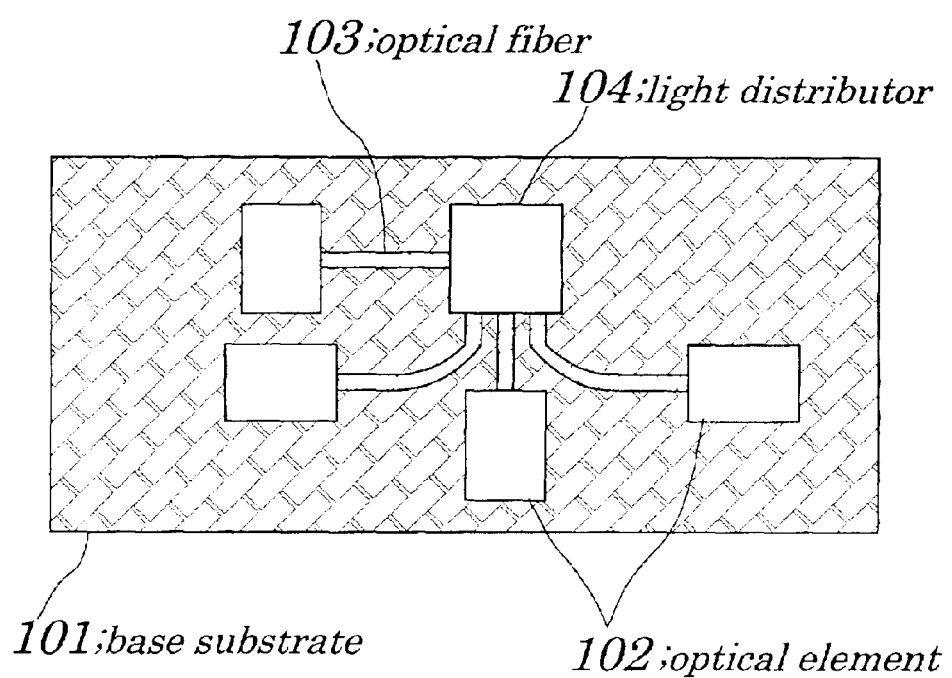
FIG. 25 is a plan view schematically showing a constitution of an optical element mounting structure using a conventional optical waveguide connecting structure.

FIG. 20 is a perspective view showing a constitution of an optical fiber mounting structure as a ninth embodiment of the present invention. FIG. 21 is a plan view showing the optical fiber mounting structure. FIG. 22 is a front view showing the optical fiber mounting structure. FIG. 23 is a side view showing the optical fiber mounting structure. FIG. 24 is another side view showing the optical fiber mounting structure.

Specifically, as shown in FIGS. 20 to 24, in an optical fiber mounting structure 41 of the embodiment, an optical waveguide film 42, in which one end portion of a core layer 42a is formed so as to be exposed on a side surface 42D and an other end portion thereof is exposed on a slant surface 42E forming an angle of about 5° or less with a film surface 42b, and an optical fiber 43, having a slant surface 43C formed so as to expose a core layer 43A thereon, the core layer 43A being covered with a clad layer 43B, are prepared. The optical waveguide film 42 and the optical fiber 43 are unitedly constituted in such a manner that an exposed surface of the core layer 42a on the slant surface 42E and an exposed surface of the core layer 43A on the slant surface 43C are aligned with each other.

In this case, the optical waveguide film 42 and the optical fiber 43 are aligned and adhered to each other by using an adhesive, and thus, the optical fiber 43 with the optical waveguide film 42 is constituted.

The optical fiber 43 with the optical waveguide film 42, which is obtained as described above, is connected to an other optical waveguide film (not shown) to make an optical coupling.

As described above, when the core layers 42a and 43A are exposed by forming the slant surfaces 42E and 43C respectively, in the optical fiber 43 with the optical waveguide film 42 or the optical fiber mounting structure 41, the slant surfaces 42E, 43C can be formed by a highly accurate process. Therefore, the optical waveguide film 42 and the optical fiber 43, which have a different shape from each other, can be united with an accuracy of several $\mu$m.

As described above, according to the optical fiber mounting structure 41 of the embodiment, the optical waveguide film 42 and the optical fiber 43 are prepared and optically coupled to each other by connecting the core layers 42a and 43A thereof, which are exposed on the slant surfaces 42E and 43C respectively. Therefore, the optical fiber 43 with the optical waveguide film 42 can be easily formed.

It is apparent that the present invention is not limited to the above embodiments but may be changed and modified without departing from the scope and spirit of the invention.

For example, though the present invention was described according to the embodiment, in which both of second and third optical waveguide films are used, if one of optical elements to be mounted is not required, for example, a light-emitting element is unnecessary, a third optical waveguide film corresponding to the light-emitting element can be omitted. Moreover, materials for each of a core layer and a clad layer constituting an optical waveguide film are not limited to ultraviolet curing epoxy resin if such materials satisfy specified conditions such as film thickness, refractive index, and a like. Other materials such as thermosetting resin, polyimide film, or a like may be used. Furthermore, dimensions such as width, thickness, and a like of each of the core layer and the clad layer have been presented as examples, and they can be changed if necessary.

Also, for optically coupling exposed surfaces of respective core layers of a plurality of optical waveguide films, the exposed surfaces may be contacted to each other by applying pressure as well as adhered to each other by an adhesive.

What is claimed is:

1. An optical waveguide connecting structure in which core layers are connected to make an optical coupling therebetween by using a plurality of optical waveguide films each having said core layers covered with a clad layer on the periphery thereof, said core layers functioning as an optical waveguide, comprising:
   a first optical waveguide provided with a first core layer, one longitudinal section of which is exposed as a first section along an optical path direction thereof; and
   a second optical waveguide provided with a second core layer, one end section portion of which is exposed as a second section,
   wherein said first section and said second section are opposed and connected to each other such that said optical path direction of said first core layer and an optical path direction of said second core layer intersect at an angle of approximately 5 degrees or less, and wherein said first core layer and the second core layer both are set at approximately a same height from a common reference surface.

2. The optical waveguide connecting structure according to claim 1, wherein at least one of said first optical waveguide and said second optical waveguide is formed of an optical waveguide film.

3. The optical waveguide connecting structure according to claim 1, wherein each of said first section of said first optical waveguide and said second section of said second optical waveguide is formed of a section vertical to a surface of said first optical waveguide.

4. The optical waveguide connecting structure according to claim 1, wherein each of said first section of said first optical waveguide and said second section of said second optical waveguide is formed of a slant surface relative to a vertical direction to a surface of said first optical waveguide.

5. The optical waveguide connecting structure according to claim 1, wherein said second optical waveguide includes a mirror surface, which is formed of a third section cut obliquely relative to a thickness direction, at an other end portion at an opposite side of said one end portion of said second core layer.

6. The optical waveguide connecting structure according to claim 1, wherein said first optical waveguide and said second optical waveguide are formed on a base substrate.

7. The optical waveguide connecting structure according to claim 1, wherein said first optical waveguide is formed on a base substrate, said second optical waveguide is formed on a reference plate, and said core layer of said second optical waveguide is aligned with said core layer of said first optical waveguide at a same height from said reference plate as said reference surface by abutting said first optical waveguide to said reference plate.

8. The optical waveguide connecting structure according to claim 1, wherein said first optical waveguide is cut to expose a side surface of said first core layer in a section along said optical path direction from said one end portion to said other end portion.

9. The optical waveguide connecting structure according to claim 5, further comprising:
   a third optical waveguide having a third core layer formed thereon and a mirror surface formed on said third core layer by cutting said third core layer obliquely relative to a thickness direction at an other end portion, said third core layer being partially exposed at a position opposed to an exposed surface of said first core layer in a side surface of said one end portion, being extended having a specified angle relative to said exposed surface of said first core layer from said exposed portion to a halfway portion, and being extended in parallel to said exposed surface of said first core layer from said halfway portion to said other end portion,
   wherein said first core layer and said third core layer are connected at approximately a same height position while maintaining a relation that said mirror surface of said third core layer and said mirror surface of said second core layer are arranged to be opposed to each other.

10. The optical waveguide connecting structure according to claim 1, wherein at least one of said second core layer and said third core layer is adhered to said first core layer by an adhesive having approximately a same refractive index as those of said first core layer to said third core layer.

11. The optical waveguide connecting structure according to claim 1, wherein two said first optical waveguides are used to be arranged on a base substrate such that said optical path directions thereof form a specified angle, said second optical waveguide is provided, which has said second sections at said both end portions of said core layer thereof, said second sections being opposed to said first sections of two said first optical waveguides, and said core layer of said second optical waveguide forms a curved-shape to change said optical path direction by a specific angle.

12. The optical waveguide connecting structure according to claim 11, wherein, instead of said second optical waveguide, an optical waveguide is used, in which a mirror surface for totally reflecting optical signals is formed at a halfway position of said core layer functioning as said optical waveguide by which said optical signals are made incident and emitted.

13. An optical element mounting structure assembled by using an optical waveguide connecting structure, comprising:
   an optical waveguide connecting structure in which core layers are connected to make an optical coupling therebetween by using a plurality of optical waveguide films each having said core layers covered with a clad layer on the periphery thereof, said core layers functioning as an optical waveguide, including: a first optical waveguide provided with a first core layer, in which a first section slightly slants relative to an optical path direction of said first core layer is set to form a small angle of approximately 5 degrees or less with said optical path direction and said first core layer is exposed in said first section; and a second optical waveguide provided with a second core layer, in which said second core layer is exposed at one end portion thereof in a section forming an angle of approximately 5 degrees or less with said optical path direction, wherein said first section and said second section are opposed and connected to each other while setting both of said first core layer and the second core layer at approximately a same height from a common reference surface; and wherein said second optical waveguide includes a mirror surface, which is formed of a third section cut obliquely relative to a thickness direction, at an other end portion at an opposite side of said one end portion of said second core layer; and an optical element substrate having an optical element connected thereto, wherein said optical element substrate is disposed such that said optical element is opposed to said mirror surface of said second core layer of said third section of said second optical waveguide.

14. An optical element mounting structure, comprising:

a base substrate having a first optical waveguide disposed thereon; and an optical element substrate, on which at least a second optical waveguide is disposed via a spacer and an optical element is mounted, wherein core layers of said first optical waveguide and said second optical waveguide are exposed in sections each forming a slight angle of approximately 5 degrees or less with optical paths of said core layers, and said base substrate and said optical element substrate are combined by abutting said first optical waveguide to a surface of said spacer of said optical element substrate as a reference surface such that said sections of said core layers are opposed to each other at a same height from said base substrate.

15. An optical element mounting structure, comprising:

a base substrate having a first optical waveguide disposed thereon; and an optical element substrate, on which at least a second optical waveguide is disposed via a spacer and an optical element is mounted, wherein core layers of said first optical waveguide and said second optical waveguide are exposed in sections each forming a slight angle of approximately 5 degrees or less with optical paths of said core layers, and said base substrate and said optical element substrate are combined by abutting said second optical waveguide to a surface of said base substrate as a reference surface such that said sections of said core layers are opposed to each other at a same height from said base substrate.

16. An optical element mounting structure, comprising:

a first optical waveguide film, in which a section of a core layer is exposed at one end portion thereof and an other end potion of said core layer exposed in a first section forming a slight angle of about 5 degrees or less with optical paths of said core layers at said other end portion of said first optical waveguide film;

an optical element of which any one of a light-emitting window and a light-receiving window of said optical element is connected to said section of said core layer of said first optical waveguide to form a combined body with said first optical waveguide film; and a second optical waveguide film, in which a core layer at least at one end portion thereof is exposed in a second section forming a slight angle of 5 degrees or less with said optical path, wherein both said first optical waveguide film and said second optical waveguide film are placed on a base substrate and said core layer exposed in said first section and said core layer exposed in said second section are aligned at a same height by using said base substrate as a reference surface and are adhered to each other.

17. An optical element mounting structure, comprising:

a first optical waveguide film, in which a section slants relative to a film surface is formed at one end portion, a core layer of a first optical waveguide is exposed in said section, said other end portion of said core layer is exposed in a first section forming a slight angle of approximately 5 degrees or less with optical paths of said core layers;

an optical element connected to a surface of said first optical waveguide film at a position to which optical signals of said first optical waveguide totally reflected at said section are reached, a second optical waveguide film, in which at least one end portion of a core layer is exposed in a second section forming a slight angle of approximately 5 degrees or less with said optical path, wherein both said first optical waveguide film and said second optical waveguide film are placed on a base substrate and said core layer exposed in said first section and said core layer exposed in said second section are aligned at a same height from said base substrate and are adhered to each other.

18. An optical element mounting structure, comprising:

a printed circuit board, in which a first optical waveguide having a core layer connected to an optical element at one end portion thereof is disposed on a base substrate, and an other end portion of said core layer of said first optical waveguide is exposed in a first section forming an angle of approximately 5 degrees or less with an optical path direction of said core layer; and a second optical waveguide film on said base substrate, having a core layer exposed in a second section forming a slight angle of approximately 5 degrees or less with said optical path in one end portion thereof, wherein one end of said second optical waveguide film is placed on said base substrate of said printed circuit board while setting said height of said core layer from said base substrate approximately equal to that of said core layer of said first optical waveguide, and said core layer exposed in said second section of said second optical waveguide film and said core layer exposed in said first section of said printed circuit board are in contact with each other.

19. The optical element mounting structure according to claim 18, wherein a reference plate covering a joint portion of said second optical waveguide film and said first optical waveguide is adhered onto said second optical waveguide film, and said height of said core layer of said second optical waveguide film is set equal to that of said core layer of said first optical waveguide by abutting said first optical waveguide to a surface of said reference plate.

20. The optical element mounting structure according to claim 18, wherein said second optical waveguide film has a portion in which a width of said optical waveguide inside said second optical waveguide film is widened in a shape of a taper and a portion in which a space portion so as to cross said optical path of said core layer at said portion widened in said shape of taper is formed, said portion being for connecting the widened core layers with interposing said space portion therebetween, and said space portion is formed to have a curved shape in which a width of the space in the direction of said optical path is widened as getting away from an optical axis of said core layer in a vertical direction.

21. An optical fiber mounting structure, comprising: first optical waveguide film, in which, a fourth section slightly slants at approximately 5 degrees or less relative to a film surface thereof is formed at one end portion, one end portion of a core layer is exposed in said fourth section, a first section is formed at an other portion of said core layer, said first section being approximately vertical to said film surface of said first optical waveguide film and forming an angle of approximately 5 degrees or less with an optical path direction of said core layer;

an optical fiber having a section cut at an angle of approximately 5 degrees or less respective to a core layer direction, said optical fiber being connected to said fourth section of said first optical waveguide film by aligning said core layers thereof; and a second optical waveguide film in which at least one end portion of said core layer is exposed in a second section vertical to said film surface and slightly slants at approximately 5 degrees or less relative to said optical path, wherein both of said first optical waveguide film and said second optical waveguide film are placed on a base substrate and a height from said base substrate of said core layer exposed in said first section and that of said corp layer exposed in said second section are set equal and adhered to each other.

* * * * *